US012711640B2

(12) United States Patent
Brown et al.

(10) Patent No.: US 12,711,640 B2
(45) Date of Patent: Aug. 18, 2026

(54) METHODS, APPARATUSES, AND COMPUTER PROGRAM PRODUCTS FOR ANALYZING IMAGE DATA RELATED TO FLUID SAMPLES

(71) Applicant: Honeywell International Inc., Charlotte, NC (US)

(72) Inventors: Andy Walker Brown, Richardson, TX (US); Peer Mohamed Shafeeq Shajudeen, Richardson, TX (US); Andrey Shtylenko, McKinney, TX (US)

(73) Assignee: Honeywell International Inc., Charlotte, NC (US)

( * ) Notice: Subject to any disclaimer, the term of this patent is extended or adjusted under 35 U.S.C. 154(b) by 741 days.

(21) Appl. No.: 17/658,577

(22) Filed: Apr. 8, 2022

(65) Prior Publication Data

US 2023/0326047 A1 Oct. 12, 2023

(51) Int. Cl.
*G06T 7/50* (2017.01)
*G01N 15/10* (2024.01)
(Continued)

(52) U.S. Cl.
CPC ........... *G06T 7/50* (2017.01); *G01N 15/1429* (2013.01); *G06V 10/225* (2022.01); *G06V 10/25* (2022.01);
(Continued)

(58) Field of Classification Search
CPC ............. G06T 7/50; G06T 2207/30024; G06T 2207/30204; G06T 2207/10028;
(Continued)

(56) References Cited

U.S. PATENT DOCUMENTS 9,176,152 B2 11/2015 Knutson et al.
9,767,341 B2 9/2017 Ozcan et al.
(Continued)

FOREIGN PATENT DOCUMENTS

WO WO-2020018154 A1 * 1/2020 ............ G02B 21/14
WO 2020/102546 A1 5/2020
WO WO-2020219468 A1 * 10/2020 .......... G03H 1/0443

OTHER PUBLICATIONS

Yazdanfar, et al. “Simple and robust image-based autofocusing for digital microscopy”, OPtics Express, Jun. 9, 2008 / vol. 16, No. 12 (Year: 2008).*

(Continued)

*Primary Examiner* — Catherine T. Rastovski
*Assistant Examiner* — Toni D Sauncy
(74) *Attorney, Agent, or Firm* — Alston & Bird LLP

(57) ABSTRACT

Example methods, apparatuses, and computer program products related to analyzing fluid samples are provided. For example, an example computer-implemented method for analyzing fluid samples includes receiving digital holography image data associated with a fluid sample in a flow chamber device; extracting, from the digital holography image data, an upper reference mark image region associated with an upper reference mark and a lower reference mark image region associated with a lower reference mark; determining a maximum focal depth and a minimum focal depth associated with the digital holography image data, respectively; focusing each of a plurality of focal depth layers associated with the digital holography image data; and extracting, from the plurality of focal depth layers, one or more region of interest (ROI) portions that are associated with the fluid sample.

20 Claims, 8 Drawing Sheets

(51) Int. Cl.
*G01N 15/1429* (2024.01)
*G06V 10/22* (2022.01)
*G06V 10/25* (2022.01)
*G06V 20/69* (2022.01)

(52) U.S. Cl.
CPC ... *G06V 20/695* (2022.01); *G01N 2015/1006* (2013.01); *G06T 2207/30024* (2013.01); *G06T 2207/30204* (2013.01)

(58) Field of Classification Search
CPC ........ G06T 2207/10056; G06T 7/0012; G01N 15/1429; G01N 2015/1006; G01N 15/1433; G01N 21/453; G01N 2015/1454; G01N 2015/1493; G01N 15/147; G01N 21/85; G06V 10/225; G06V 10/25; G06V 20/695; G03H 2001/005; G03H 1/0866; G03H 1/0808; G03H 2001/0447; G03H 2001/0883; G03H 2210/454; G03H 2210/62; G03H 1/0443; G02B 21/367; G02B 27/32
See application file for complete search history.

(56) References Cited

U.S. PATENT DOCUMENTS

| | | | | |
|---|---|---|---|---|
| 10,558,029 | B2 | 2/2020 | Leshem et al. | |
| 11,013,843 | B2 | 5/2021 | Gerber et al. | |
| 2013/0274119 | A1* | 10/2013 | Knutson | G01N 15/1433 506/9 |
| 2017/0309036 | A1* | 10/2017 | Perraut | G03H 1/0866 |
| 2018/0120553 | A1* | 5/2018 | Leshem | G02B 21/34 |
| 2020/0103327 | A1 | 4/2020 | Yellin et al. | |
| 2020/0233200 | A1 | 7/2020 | Cahoon et al. | |
| 2020/0294763 | A1* | 9/2020 | Chang | H01J 37/26 |
| 2020/0382715 | A1* | 12/2020 | Hong | H04N 23/56 |
| 2021/0033514 | A1* | 2/2021 | Brown | G01N 15/0612 |
| 2021/0364686 | A1* | 11/2021 | Lim | G02B 27/4205 |
| 2022/0206434 | A1* | 6/2022 | Ozcan | G03H 1/0866 |

OTHER PUBLICATIONS

Rossi, et. al., “A fast and robust algorithm for General Defocusing Particle Tracking”, arXiv:1912.01912v3 [physics.flu-dyn] Nov. 9, 2020 (Year: 2020).*

Fiala, et al., “Designing Highly Reliable Fiducial Markers”, IEEE Transactions on Pattern Analysis and Machine Intelligence, Jul. 2010, pp. 1317-1324, vol. 32 (Year: 2010).*

Garrido-Jurado , et al., “Automatic generation and detection of highly reliable fiducial markers under occlusion”, Jun. 2014 Pattern Recognition 47(6):2280-2292. (Year: 2014).*

Han, et. al., “A fast fiducial marker tracking model for fully automatic alignment in electron tomography”, Bioinformatics, vol. 34, Issue 5, Mar. 2018, pp. 853-863. (Year: 2018).*

Mohammadian, et al., “High accuracy, fiducial marker-based image registration of correlative microscopy images”, Nature Sci Rep. Mar. 1, 2019;9:3211. (Year: 2019).*

Orlov, et al., “High-performance holographic technologies for fluid-dynamics experiments”, Philos Trans A Math Phys Eng Sci. Apr. 13, 2010;368(1916): 1705-37. (Year: 2010).*

Orzo, et al., “High speed water monitoring systems based on Digital Holographic Microscopy,” Ninth International Conference on Computer Science and Information Technologies Revised Selected Papers, Yerevan, Armenia, 2013, pp. 1-9. (Year: 2013).*

Yang, et al., “Angular-spectrum modeling of focusing light inside scattering media by optical phase conjugation”, Optica. Mar. 20, 2019; 6(3): 250-256. (Year: 2019).*

European search report Mailed on Jul. 5, 2023 for EP Application No. 23159611, 8 page(s).

EP Office Action Mailed on Feb. 27, 2026 for EP Application No. 23159611, 6 page(s).

* cited by examiner

METHODS, APPARATUSES, AND COMPUTER PROGRAM PRODUCTS FOR ANALYZING IMAGE DATA RELATED TO FLUID SAMPLES

FIELD OF THE INVENTION

Example embodiments of the present disclosure relate generally to performing fluid sample analysis and include, for example, methods, apparatuses and computer program products for analyzing digital holography image data associated with fluid samples.

BACKGROUND

Applicant has identified many technical challenges and difficulties associated with analyzing fluid samples. For example, many methods and systems fail to provide an effective mechanism that allows peritoneal dialysis (PD) effluent to be properly analyzed.

BRIEF SUMMARY

Various embodiments described herein relate to methods, apparatuses, and systems for analyzing image data related to fluid samples.

In accordance with various embodiments of the present disclosure, an example computer-implemented method for analyzing fluid samples is provided. In some embodiments, the example computer-implemented method comprises receiving digital holography image data associated with a fluid sample in a flow chamber device comprising an upper reference mark on an upper surface of the flow chamber device and a lower reference mark on a lower surface of the flow chamber device; and determining a maximum focal depth and a minimum focal depth associated with the digital holography image data based at least in part on an upper reference mark image region and a lower reference mark image region of the digital holography image data, respectively.

In some embodiments, the computer-implemented method comprises extracting, from the digital holography image data, the upper reference mark image region associated with the upper reference mark and the lower reference mark image region associated with the lower reference mark.

In some embodiments, the computer-implemented method comprises focusing each of a plurality of focal depth layers associated with the digital holography image data based at least in part on the maximum focal depth and the minimum focal depth; and extracting, from the plurality of focal depth layers, one or more region of interest (ROI) portions associated with the fluid sample.

In some embodiments, the digital holography image data is received from an imaging device that is positioned under the lower surface of the flow chamber device.

In some embodiments, the maximum focal depth corresponds to a first focal depth between the upper surface of the flow chamber device and the imaging device. In some embodiments, the minimum focal depth corresponds to a second focal depth between the lower surface of the flow chamber device and the imaging device.

In some embodiments, the upper reference mark image region is extracted from the digital holography image data based at least in part on an upper reference mark location associated with the upper reference mark. In some embodiments, the lower reference mark image region is extracted from the digital holography image data based at least in part on a lower reference mark location associated with the lower reference mark.

In some embodiments, the computer-implemented method further comprises focusing the upper reference mark image region based at least in part on an Angular Spectrum Propagation (ASP) based image focusing algorithm. In some embodiments, the upper reference mark is in focus from the upper reference mark image region at the maximum focal depth.

In some embodiments, the computer-implemented method further comprises focusing the lower reference mark image region based at least in part on an ASP-based image focusing algorithm. In some embodiments, the lower reference mark is in focus from the lower reference mark image region at the minimum focal depth.

In some embodiments, at least one of the upper reference mark or the lower reference mark comprises an authentication indicium. In some embodiments, the computer-implemented method further comprises: extracting authentication data associated with at least one of the upper reference mark or the lower reference mark.

In some embodiments, the computer-implemented method further comprises: extracting a fluid sample relevant image region from the digital holography image data. In some embodiments, the upper reference mark and the lower reference mark are not on the fluid sample relevant image region.

In some embodiments, focusing each of the plurality of focal depth layers associated with the digital holography image data further comprises focusing only the fluid sample relevant image region.

In some embodiments, focusing each of the plurality of focal depth layers associated with the digital holography image data further comprising: determining a focal depth layer count number associated with the plurality of focal depth layers; and calculating a corresponding focal depth range associated with each of the plurality of focal depth layers based at least in part on the maximum focal depth, the minimum focal depth, and the focal depth layer count number.

In some embodiments, the fluid sample comprises one or more particles. In some embodiments, extracting the one or more ROI portions further comprises: determine a plurality of candidate ROI portions associated with the one or more particles of the fluid sample; and determining, for each of the one or more particles, an optimally focused ROI portion from the plurality of candidate ROI portions.

In accordance with various embodiments of the present disclosure, an apparatus for analyzing fluid samples is provided. In some embodiments, the apparatus comprises at least one processor and at least one non-transitory memory comprising program code. In some embodiments, the at least one non-transitory memory and the program code are configured to, with the at least one processor, cause the apparatus to at least: receive digital holography image data associated with a fluid sample in a flow chamber device comprising an upper reference mark on an upper surface of the flow chamber device and a lower reference mark on a lower surface of the flow chamber device; and determine a maximum focal depth and a minimum focal depth associated with the digital holography image data based at least in part on an upper reference mark image region and a lower reference mark image region of the digital holography image data, respectively. In some embodiments, the flow chamber device is removable or replaceable.

In accordance with various embodiments of the present disclosure, a computer program product for analyzing fluid samples is provided. In some embodiments, the computer program product comprises at least one non-transitory computer-readable storage medium having computer-readable program code portions stored therein. In some embodiments, the computer-readable program code portions comprise an executable portion configured to: receive digital holography image data associated with a fluid sample in a flow chamber device comprising an upper reference mark on an upper surface of the flow chamber device and a lower reference mark on a lower surface of the flow chamber device; and determine a maximum focal depth and a minimum focal depth associated with the digital holography image data based at least in part on an upper reference mark image region and a lower reference mark image region of the digital holography image data, respectively; focus each of a plurality of focal depth layers associated with the digital holography image data based at least in part on the maximum focal depth and the minimum focal depth; and extract, from the plurality of focal depth layers, one or more ROI portions associated with the fluid sample.

The foregoing illustrative summary, as well as other exemplary objectives and/or advantages of the disclosure, and the manner in which the same are accomplished, are further explained in the following detailed description and its accompanying drawings.

BRIEF DESCRIPTION OF THE DRAWINGS

The description of the illustrative embodiments may be read in conjunction with the accompanying figures. It will be appreciated that, for simplicity and clarity of illustration, elements illustrated in the figures have not necessarily been drawn to scale, unless described otherwise. For example, the dimensions of some of the elements may be exaggerated relative to other elements, unless described otherwise. Embodiments incorporating teachings of the present disclosure are shown and described with respect to the figures presented herein, in which.

DETAILED DESCRIPTION OF THE INVENTION

Figure 1:
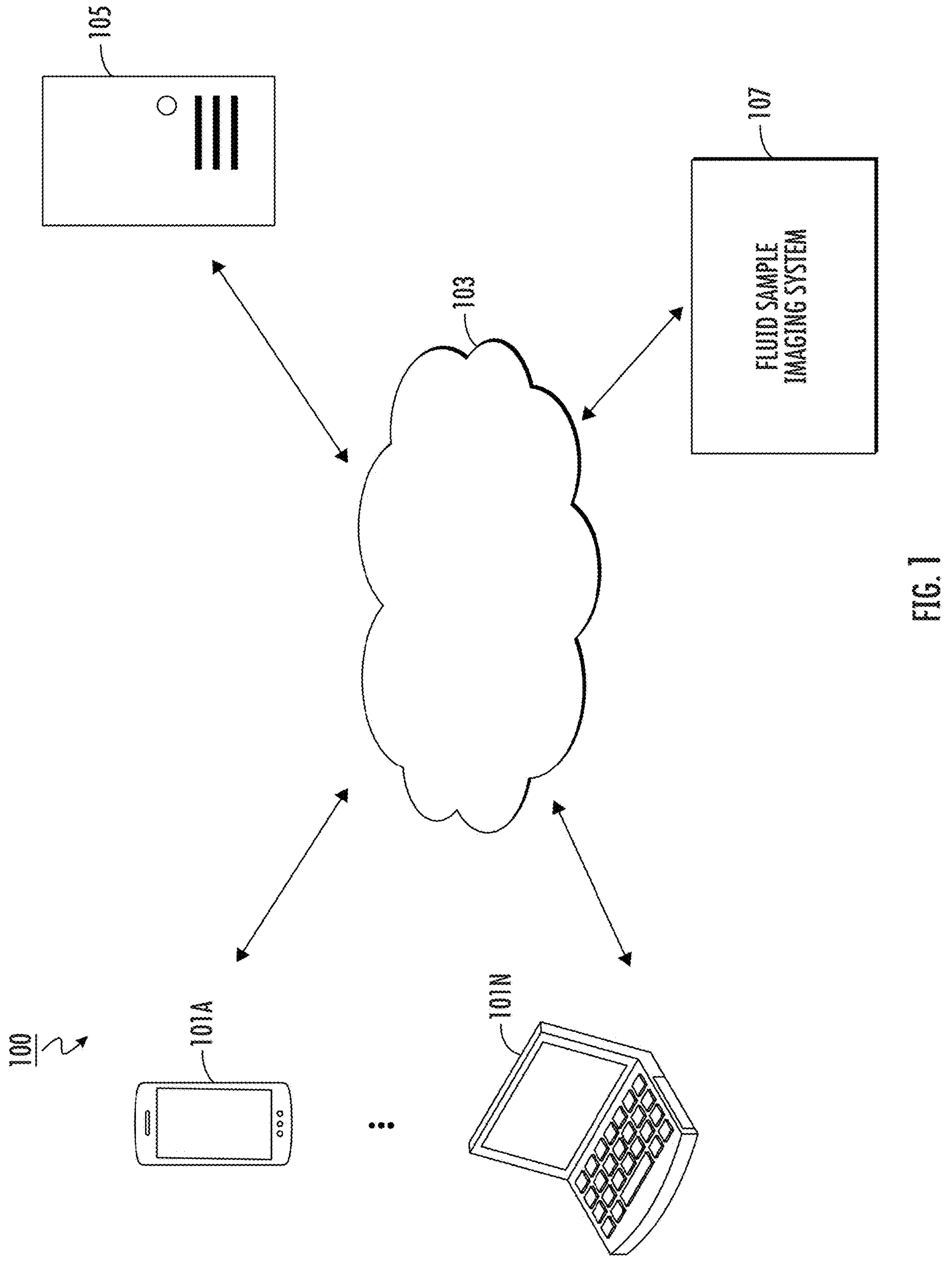
FIG. 1 illustrates an example fluid sample analytics platform in accordance with some example embodiments described herein.

Some embodiments of the present disclosure will now be described more fully hereinafter with reference to the accompanying drawings, in which some, but not all embodiments of the disclosure are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout.

As used herein, terms such as "front," "rear," "top," etc. are used for explanatory purposes in the examples provided below to describe the relative position of certain components or portions of components. Furthermore, as would be evident to one of ordinary skill in the art in light of the present disclosure, the terms "substantially" and "approximately" indicate that the referenced element or associated description is accurate to within applicable engineering tolerances.

As used herein, the term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

The phrases "in one embodiment," "according to one embodiment," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The word "example" or "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that a specific component or feature is not required to be included or to have the characteristic. Such a component or feature may be optionally included in some embodiments, or it may be excluded.

As described above, there are many technical challenges and difficulties associated with analyzing fluid samples including, but not limited to, those related to medical analysis in renal care.

"Renal care" refers to medical care that provides diagnosis and treatment associated with the kidney (including but not limited to, chronic renal disease and/or acute renal disease). For example, when the patient's kidney stops working properly, renal care may include, but not limited to, performing dialysis procedures. The dialysis procedures are designed to remove waste products and excess fluids from the blood of the patient, and therefore improve the health of the patient.

While peritoneal dialysis (PD) provides a mechanism to remove waste products from a patient's blood when the patient's kidneys cannot adequately function, PD is different from traditional hemodialysis (HD).

In particular, during an example PD procedure, a cleansing fluid (such as, but not limited to, a dialysis solution such as water with sugar and other additive) flows through a tube or a pipe (such as, but not limited to, a catheter) into the patient's body. More specifically, the cleansing fluid is injected into a part of a patient's abdomen. When the cleansing fluid is inside the patient's body, the cleansing fluid absorbs waste products from the patient's body. The lining of the abdomen (also known as peritoneum) can act as a filter and remove waste products from the patient's blood. After a set period of time, the fluid with the filtered waste products (referred herein as peritoneal dialysis (PD) effluent) flows out of the patient's abdomen and can be discarded.

However, PD procedures are faced with some drawbacks. One of the drawbacks is that patients who undergo PD may develop infections, which can force patients to switch back to HD. As such, early detection of infections after a patient undergoes PD can be beneficial for alerting patients, as well as care providers, so that early action can be taken to limit the severity and frequency of infections.

Various embodiments of the present disclosures enable such early detection of infections while a patient undergoes PD.

For example, various embodiments of the present disclosures provide a fluid sample imaging system that provides an effective mechanism to sample PD effluent and capture image data associated with the PD effluent. In some embodiments, the fluid sample imaging system works in tandem with a PD machine (also referred to as a "cycler"). For example, the fluid sample imaging system may be integrated into the PD machine. Additionally, or alternatively, the fluid sample imaging system may operate as a stand-alone device that is connected to the fluid conduit from the PD machine to receive the PD effluent. In particular, the fluid sample imaging system comprises a flow chamber device. As the PD effluent is pumped out of the patient's body, some of the fluid passes through the flow chamber device.

The fluid sample imaging system may also include an imaging device that can generate digital holography image data of the PD effluent. In some embodiments, after the digital holography image data is generated, the fluid sample imaging system may upload the digital holography image data to a remote computing platform (for example, one or more remote computing servers that are in data communications with one another). In some embodiments, the digital holography image data comprises digital holography image(s) of the PD effluent, and the remote computing platform can computationally generate reconstructed/focused image(s) based on the digital holography image(s) using a computer algorithm based on Angular Spectrum Propagation (ASP). In some embodiments, estimated sample characteristics data associated with the fluid sample can be determined based on the reconstructed/focused image(s). For example, the reconstructed/focused image(s) can be provided to one or more machine learning (ML) models to detect, count, classify, and/or measure the sizes of the detected particles and cells from the PD effluent as shown in the reconstructed/focused image(s).

In some embodiments, the results (e.g. estimated sample characteristics data) from the ML models can be provided to mobile computing devices operated by end users (for example, patients, healthcare providers, etc.), enabling near-real-time analysis of the PD fluid contents and detection of infection. For example, the more white blood cells that there are in the PD effluent, the more likely that the patient is having an infection as the white blood cells make the PD effluent cloudy. As such, various embodiments of the present disclosure can detect indicators of infections based on the PD effluent, and can have the potential to detect infections earlier (which can lead to better patient outcomes) and provide better specificity in the detection results (for example, based on the concentrations of white blood cells and/or types of white blood cells).

However, there are many technical challenges and difficulties associated with analyzing the digital holography image data of the PD effluent and ensuring that the generated image quality is sufficient for accurate detection and counting of white blood cells in the PD effluent.

For example, particles of interest in a fluid sample (such as, but not limited to, white blood cells in a PD effluent) may be not captured on a single imaging plane. In many instances, particles of interest (such as, but not limited to, white blood cells in a PD effluent) can be suspended at various depths within the flow channel of the fluid flow chamber as the fluid sample (such as PD effluent) flows through the flow channel.

In some embodiments, an example ASP-based image focusing algorithm may automatically determine a global focal depth for a global "best focus" of the digital holography image within a pre-specified focal depth search range. However, if there are too many variations in the actual depth Z values of particles of interest relative to the global focal depth, not all particles of interest (such as, but not limited to, white blood cells in a PD effluent) can be in focus in the global "best focus" image based on the digital holography image. As such, many ASP-based image focusing algorithms fail to generate a sufficiently focused image where all particles of interest (such as, but not limited to, white blood cells in a PD effluent) are in focus, resulting in the detection, count, classification, and/or measurement of the sizes of the detected particles and cells from the PD effluent to be inaccurate.

Additionally, mechanical variations in the fluid sample imaging system may cause many technical challenges and difficulties in analyzing the digital holography image data.

For example, an example fluid sample imaging system may include a flow chamber device and an imaging device that is positioned under the flow chamber device for generating digital holography image data. In some embodiments, there may be variations (within tolerance) in the actual dimensions of the flow chamber device from the designed dimensions of the flow chamber device due to its manufacturing process. Similarly, there may be variations (within tolerance) in the actual dimensions of the imaging device from the designed dimensions of the imaging device due to its manufacturing process. Additionally, or alternatively, the flow chamber device may need to be replaced regularly, and inevitable variations in the insertion locations of the flow chamber device may cause small shifts in the relative distance between the image sensing surface of the imaging device and the fluid sample in the flow chamber device (in X, Y, and/or Z dimensions). As such, mechanical variations can cause the minimum focal depth Zmin between the imaging device and the flow chamber device and/or the maximum focal depth Zmax between the imaging device and the flow chamber device to shift. As the focal depth shifts, many example ASP-based image focusing algorithms cannot generate an accurately focused image based on the digital holography image data to be used by a ML model to detect, count, classify, and/or measure the sizes of the detected particles and cells from the PD effluent.

In contrast, various example embodiments of the present disclosure overcome such technical challenges and difficulties in analyzing fluid samples, and provide various technical advancements and improvements.

For example, various embodiments of the present disclosure provide reference marks on the upper interior surface and the lower interior surface of the flow chamber device. The reference marks can provide focal plane references for determining the Zmax value and the Zmin value, which can be used to calibrate an example ASP-based image focusing algorithm. Because the reference marks can provide clear indicators for determining the Zmax value and the Zmin value, various embodiments of the present disclosure overcome technical challenges and difficulties related to shifting Zmax value and Zmin value due to mechanical variations.

By implementing the reference marks, various embodiments of the present disclosure also prevent an example ASP-based image focusing algorithm from focusing on debris and/or defects on the external surfaces of the flow chamber device, especially when there are low concentrations of cells/particles of interest (which can be a common condition). As such, particles on the external surfaces will be out of focus in images generated by an example ASP-based image focusing algorithm in some embodiments of the present disclosure, and therefore are less likely to interfere with the subsequent detection, counting, classification, and/or measurement the sizes of the detected particles and cells from the PD effluent by a ML model.

In addition, the refractive index of the fluid sample in the flow chamber device may vary over time, which may in turn cause shifts in the apparent focal depth Z range between the flow chamber device and the imaging device as estimated by an example ASP-based image focusing algorithm. By focusing on the reference marks, various embodiments of the present disclosure automatically adjusts the apparent focal depth Z range when the refractive index of the fluid sample in the flow chamber device varies, therefore reducing inaccuracies in estimating the apparent focal depth Z range for calibrating the example ASP-based image focusing algorithm.

Further, as described above, an example ASP-based image focusing algorithm may automatically determine a focal depth within a pre-specified focal depth search range for a global "best focus" image based on the digital holography image. Various embodiments of the present disclosure may calibrate the focal depth search range used by the ASP-based image focusing algorithm based on the focal depth Z values associated with the reference marks. Subsequently, various embodiments of the present disclosure may segment the focal depth Z range into multiple focal depth segments/layers (such as, but not limited to, four focal depth layers). Because the reference marks can provide focal plane references, various embodiments of the present disclosure enable the focal depth Z range to be segmented properly.

Various embodiments of the present disclosure may implement the ASP-based image focusing algorithm on each of the focal depth segments/layers to generate a "locally" focused image, and then combine results from different focal depth segments/layers to generate an optimally focused image. For example, various embodiments of the present disclosure provide optimization of focus for individual particles/cells of interest in the fluid sample (such as, but not limited to, white blood cells with cell diameters approximately between 12 microns and 15 microns in the PD effluent that is flowing within a flow channel with a depth approximately between 0.2 millimeters and 0.8 millimeters). As such, various embodiments of the present disclosure increase the speed and the accuracy in analyzing digital holography image data and generating focused images based on the digital holography image data.

Continuing from the PD effluent example described above, various embodiments of the present disclosure provide a fluid sample imaging system that can be used in conjunction/separation with a PD machine to capture a digital holography image when the PD effluent fluid is passed through a flow chamber device. The captured image may be uploaded to a cloud server (or, additionally or alternatively, processed by a processor component in the fluid sample imaging system as described herein), where an ASP-based image focusing algorithm is applied on the reference mark regions of the digital holography image to determine focal depth Z value of the reference marks. The ASP-based image focusing algorithm generates focused images based at least in part on determined Z values, and the focused images are fed to ML models to detect, classify, and/or count the detected particles and cells. As such, various embodiments of the present disclosure not only mitigate many technical challenges and difficulties that need to be overcome for analyzing image data related to fluid samples from realistic environments, but also enable additional diagnostic and analytical functionalities that may be useful for enhanced capabilities in image data analysis, details of which are described herein.

Referring now to FIG. 1, an example diagram illustrating an example fluid sample analytics platform 100 in accordance with some example embodiments described herein is provided.

As shown in FIG. 1, the example fluid sample analytics platform 100 may comprise apparatuses, devices, and components such as, but not limited to, a fluid sample imaging system 107, one or more mobile computing devices 101A . . . 101N, a remote computing server 105 in a remote computing platform, and one or more networks 103.

In some embodiments, each of the components of the example fluid sample analytics platform 100 may be in electronic communication with, for example, one another over the same or different wireless or wired networks 103 including, for example, a wired or wireless Personal Area Network (PAN), Local Area Network (LAN), Metropolitan Area Network (MAN), Wide Area Network (WAN), and/or the like. Additionally, while FIG. 1 illustrates certain system entities as separate, standalone entities, the various embodiments are not limited to this particular architecture.

For example, the fluid sample imaging system 107, one or more mobile computing devices 101A . . . 101N, the remote computing server 105 in the remote computing platform may be in electronic communication with one another to exchange data and information. As described herein, the fluid sample imaging system 107 may receive a fluid sample (such as, but not limited to, peritoneal dialysis effluent, urine, oil, blood, and/or the like) and may comprise an imaging device that generates digital holography image data associated with the fluid sample. In some embodiments, the fluid sample imaging system 107 may transmit the digital holography image data to the one or more mobile computing devices 101A . . . 101N and/or the remote computing server 105 in the remote computing platform for analysis.

In some embodiments, the one or more mobile computing devices 101A . . . 101N and/or the remote computing server 105 in the remote computing platform may receive the digital holography image data from the imaging device of the fluid sample imaging system 107, and may generate estimated sample characteristics data associated with the fluid sample based at least in part on the digital holography image data. For example, the one or more mobile computing devices 101A . . . 101N and/or the remote computing server 105 may generate one or more focused images based on the digital holography image data in accordance with various example methods described herein, including, but not limited to, those described in connection with at least FIG. 5 to FIG. 8. In some embodiments, the one or more mobile computing devices 101A . . . 101N and/or the remote computing server 105 may provide the one or more focused images to one or more machine learning (ML) models.

The term "machine learning model" refers to a computer algorithm that may perform one or more specific tasks through pattern/interference recognition and without the need for explicit instructions. Example machine learning models may include, but not limited to, deep learning models, ensemble models, regression models, and/or the like. For example, the one or more mobile computing devices 101A . . . 101N and/or the remote computing server 105 in the remote computing platform may implement an example recurrent neural network (RNN) to analyze the focused images to generate estimated sample characteristics data. In such an example, the example RNN may be trained to detect, count, classify, and/or measure the sizes of the detected particles and cells from the focused images. In particular, the example RNN may comprise one or more layers of interconnected nodes, where each node may produce one or more output vectors based on one or more input vectors. The computing entity may provide the focused images generated by the ASP-based image focusing algorithm as input vectors to the input layer of an example RNN, and nodes in the input layer may produce one or more output vectors, which may be fed into the next layer of nodes. Eventually, the example RNN may output estimated sample characteristics data.

In some embodiments, the estimated sample characteristics data comprises an estimated number of white blood cells within the fluid sample, an estimated concentration level of white blood cells within the fluid sample, estimated size values of particles within the fluid sample, and/or the like. In some embodiments, the one or more mobile computing devices 101A . . . 101N and/or the remote computing server 105 may transmit the estimated sample characteristics data to another device (such as, but not limited to, the fluid sample imaging system 107, one of the one or more mobile computing devices 101A . . . 101N, and/or another remote computing server in the remote computing platform).

While the description above provides an example of analyzing digital holography image data, it is noted that the scope of the present disclosure is not limited to the description above. In some embodiments, the fluid sample imaging system 107 may additionally or alternatively determine estimated sample characteristics data associated with the fluid sample based at least in part on the digital holography image data. For example, the fluid sample imaging system 107 may comprise a processor component, similar to the processor component of the one or more mobile computing devices 101A . . . 101N and/or the remote computing server 105 described herein. In some embodiments, the processor component of the fluid sample imaging system 107 may generate one or more focused images based on the digital holography image data in accordance with various example methods described herein, including, but not limited to, those described in connection with at least FIG. 5 to FIG. 8. In some embodiments, the processor component of the fluid sample imaging system 107 may provide the one or more focused images to one or more ML models to generate estimated sample characteristics data, similar to those described above.

While the description above provides an example fluid sample analytics platform, it is noted that the scope of the present disclosure is not limited to the description above. In some examples, an example fluid sample analytics platform may comprise one or more additional and/or alternative elements. For example, an example fluid sample analytics platform in accordance with embodiments of the present disclosure may comprise more than one fluid sample imaging system. Additionally, or alternatively, an example fluid sample analytics platform in accordance with embodiments of the present disclosure may comprise more than one remote computing server and/or more than one remote computing platform.

Figure 2:
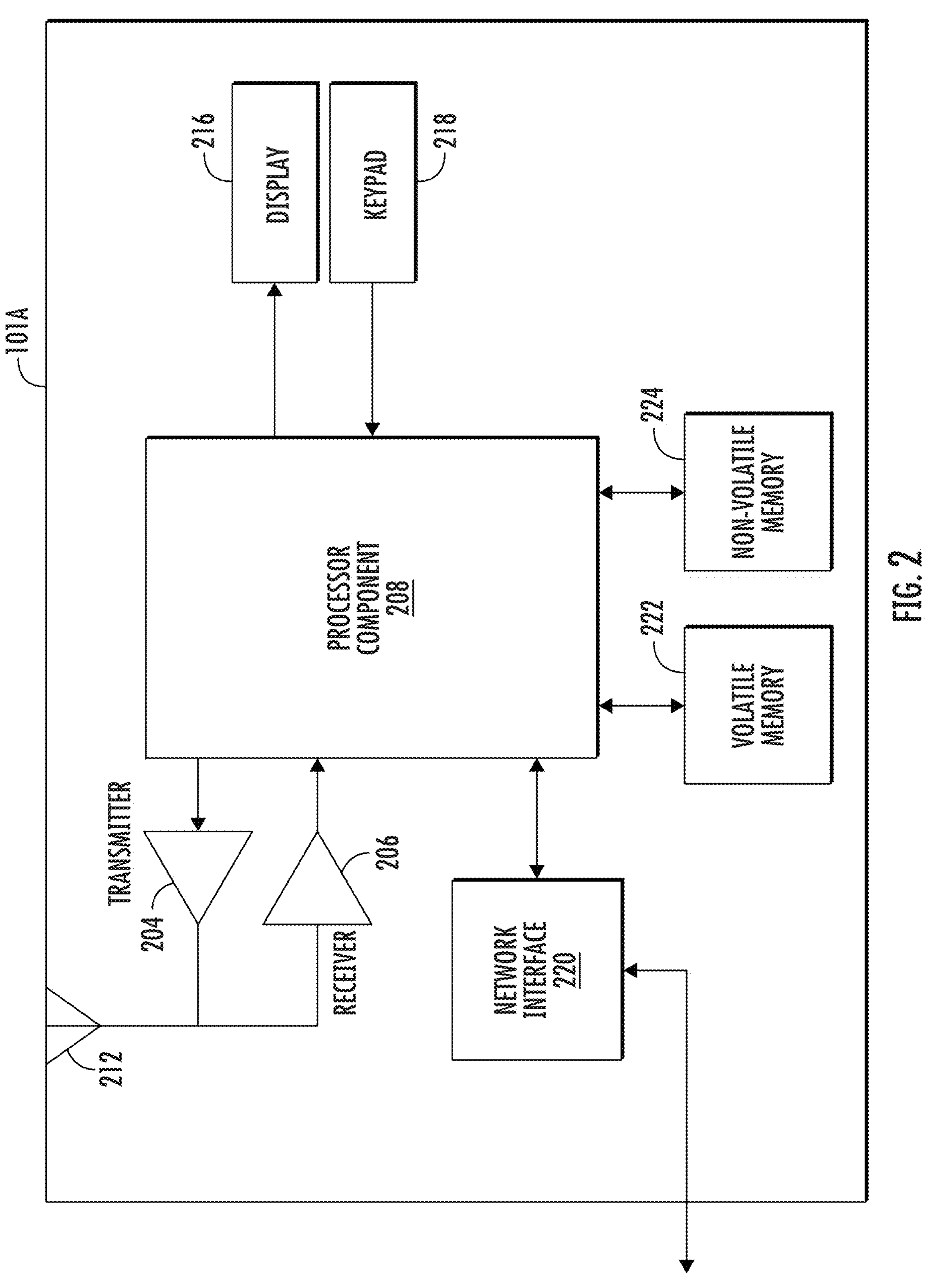
FIG. 2 is an example schematic representation of an example mobile computing device in accordance with some example embodiments described herein.

Referring now to FIG. 2, an example schematic representation of an example mobile computing device in accordance with some example embodiments described herein is provided. For example, FIG. 2 provides an illustrative schematic representative of one of the mobile computing devices 101A to 101N that can be used in conjunction with embodiments of the present disclosure.

In some embodiments, the mobile computing device 101A can include an antenna 212, a transmitter 204 (e.g., radio), a receiver 206 (e.g., radio), and a processor component 208 that provides signals to and receives signals from the transmitter 204 and receiver 206, respectively. The signals provided to and received from the transmitter 204 and the receiver 206, respectively, may include signaling information/data in accordance with an air interface standard of applicable wireless systems to communicate with various entities, such as a remote computing server 105, another mobile computing device 101A, an example fluid sample imaging system and/or the like. In this regard, the mobile computing device 101A may be capable of operating with one or more air interface standards, communication protocols, modulation types, and access types. More particularly, the mobile computing device 101A may comprise a network interface 220, and may operate in accordance with any of a number of wireless communication standards and protocols. In a particular embodiment, the mobile computing device 101A may operate in accordance with multiple wireless communication standards and protocols, such as GPRS, UMTS, CDMA1900, 1×RTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol.

Via these communication standards and protocols, the mobile computing device 101A can communicate with various other entities using Unstructured Supplementary Service data (USSD), Short Message Service (SMS), Multimedia Messaging Service (MMS), Dual-Tone Multi-Frequency (DTMF) Signaling, Subscriber Identity Module Dialer (SIM dialer), and/or the like. The mobile computing device 101A can also download changes, add-ons, and updates, for instance, to its firmware, software (e.g., including executable instructions, applications, program modules), and operating system.

The mobile computing device 101A may also comprise a user interface comprising one or more user input/output interfaces (e.g., a display 216 and/or speaker/speaker driver coupled to a processor component 208 and a touch screen, keyboard, mouse, and/or microphone coupled to a processor component 208). For example, the user output interface may be configured to provide an application, browser, user interface, dashboard, webpage, and/or similar words used herein interchangeably executing on and/or accessible via the mobile computing device 101A to cause display or audible presentation of information/data and for user interaction therewith via one or more user input interfaces. The user output interface may be updated dynamically from communication with the remote computing server 105. The user input interface can comprise any of a number of devices allowing the mobile computing device 101A to receive data, such as a keypad 218 (hard or soft), a touch display, voice/speech or motion interfaces, scanners, readers, or other input device. In embodiments including a keypad 218, the keypad 218 can include (or cause display of) the conventional numeric (0-9) and related keys (#, *), and other keys used for operating the mobile computing device 101A and may include a full set of alphabetic keys or set of keys that may be activated to provide a full set of alphanumeric keys. In addition to providing input, the user input interface can be used, for example, to activate or deactivate certain functions, such as screen savers and/or sleep modes. Through such inputs the mobile computing device 101A can collect information/data, user interaction/input, and/or the like.

The mobile computing device 101A can also include volatile storage or memory 222 and/or non-volatile storage or memory 224, which can be embedded and/or may be removable. For example, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database management system entities, data, applications, programs, program modules, scripts, source code, object code, byte code, compiled code, interpreted code, machine code, executable instructions, and/or the like to implement the functions of the mobile computing device 101A-101N.

Figure 3:
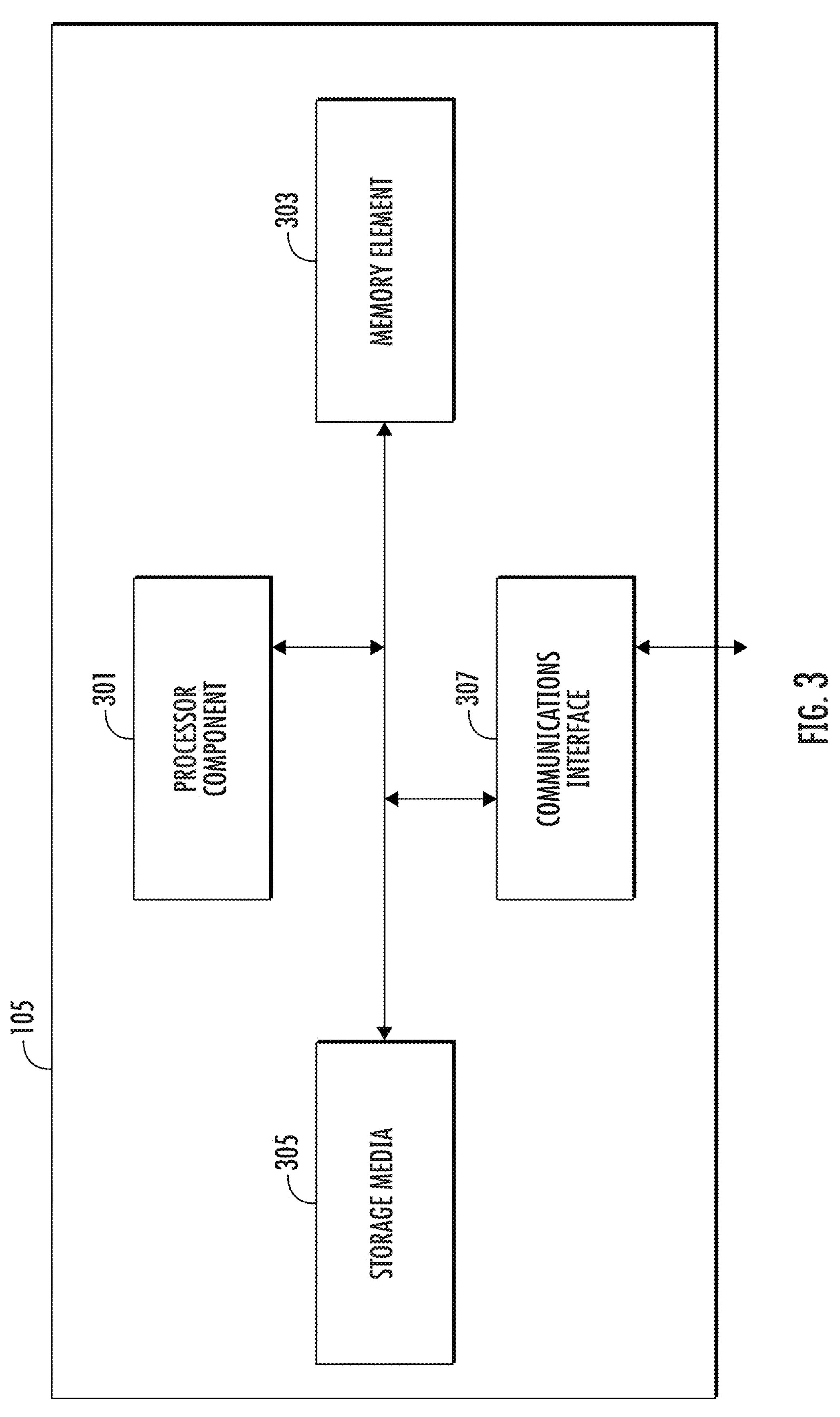
FIG. 3 is an example schematic representation of an example remote computing server of an example remote computing platform in accordance with some example embodiments described herein.

Referring now to FIG. 3, an example schematic representation of an example remote computing server 105 in an example remote computing platform in accordance with some example embodiments described herein. In some embodiments, the example remote computing platform may be a cloud computing platform, and the example remote computing server may be a cloud computing server.

As indicated, in some embodiments, the remote computing server 105 may include one or more network and/or communications interface 307 for communicating with various computing entities, such as by communicating data, content, information, and/or similar terms used herein that can be transmitted, received, operated on, processed, displayed, stored, and/or the like. For instance, the remote computing server 105 may communicate with fluid sample imaging system 107, one or more mobile computing devices 101A . . . 101N, and/or the like.

As shown in FIG. 3, in one embodiment, the remote computing server 105 may include or be in communication with one or more processor components (for example, processor component 301) (also referred to as processor components, processing circuitry, and/or similar terms used herein interchangeably) that communicate with other elements within the remote computing server 105 via a bus, for example, or network connection. As will be understood, the processor component 301 may be embodied in a number of different ways. For example, the processor component 301 may be embodied as one or more complex programmable logic devices (CPLDs), microprocessor components, multi-core processor components, co-processing entities, application-specific instruction-set processor components (ASIPs), and/or controllers. Further, the processor component 301 may be embodied as one or more other processing devices or circuitry. The term circuitry may refer to an entirely hardware embodiment or a combination of hardware and computer program products. Thus, the processor component 301 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processor component 301 may be configured for a particular use or configured to execute instructions stored in volatile or non-volatile media or otherwise accessible to the processor component 301. As such, whether configured by hardware or computer program products, or by a combination thereof, the processor component 301 may be capable of performing steps or operations according to embodiments of the present disclosure when configured accordingly.

In one embodiment, the remote computing server 105 may further include or be in communication with volatile media (also referred to as volatile storage, memory, memory storage, memory circuitry and/or similar terms used herein interchangeably). In one embodiment, the volatile storage or memory may also include one or more memory element 303 as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the volatile storage or memory element 303 may be used to store at least portions of the databases, database instances, database management system entities, data, applications, programs, program modules, scripts, source code, object code, byte code, compiled code, interpreted code, machine code, executable instructions, and/or the like being executed by, for example, the processor component 301 as shown in FIG. 3. Thus, the databases, database instances, database management system entities, data, applications, programs, program modules, scripts, source code, object code, byte code, compiled code, interpreted code, machine code, executable instructions, and/or the like may be used to control certain aspects of the operation of the remote computing server 105 with the assistance of the processor component 301 and operating system.

In one embodiment, the remote computing server 105 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or storage media 305 as described above, such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or storage media 305 may store databases, database instances, database management system entities, data, applications, programs, program modules, scripts, source code, object code, byte code, compiled code, interpreted code, machine code, executable instructions, and/or the like. The term database, database instance, database management system entity, and/or similar terms used herein interchangeably and in a general sense to refer to a structured or unstructured collection of information/data that is stored in a computer-readable storage medium.

Storage media 305 may also be embodied as a data storage device or devices, as a separate database server or servers, or as a combination of data storage devices and separate database servers. Further, in some embodiments, storage media 305 may be embodied as a distributed repository such that some of the stored information/data is stored centrally in a location within the system and other information/data is stored in one or more remote locations. Alternatively, in some embodiments, the distributed repository may be distributed over a plurality of remote storage locations only. An example of the embodiments contemplated herein would include a cloud data storage system maintained by a third-party provider and where some or all of the information/data required for the operation of the recovery prediction system may be stored.

As indicated, in one embodiment, the remote computing server 105 may also include one or more network and/or communications interface 307 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the remote computing server 105 may be configured to communicate via wireless external communication networks using any of a variety of protocols, such as general packet radio service (GPRS), Universal Mobile Telecommunications System (UMTS), Code Division Multiple Access 1900 (CDMA1900), CDMA1900 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), Institute of Electrical and Electronics Engineers (IEEE) 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol. The remote computing server 105 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

As will be appreciated, one or more of the remote computing server's components may be located remotely from components of other remote computing servers, such as in a distributed system. Furthermore, one or more of the components may be aggregated and additional components performing functions described herein may be included in the remote computing server 105. Thus, the remote computing server 105 can be adapted to accommodate a variety of needs and circumstances.

Figure 4A:
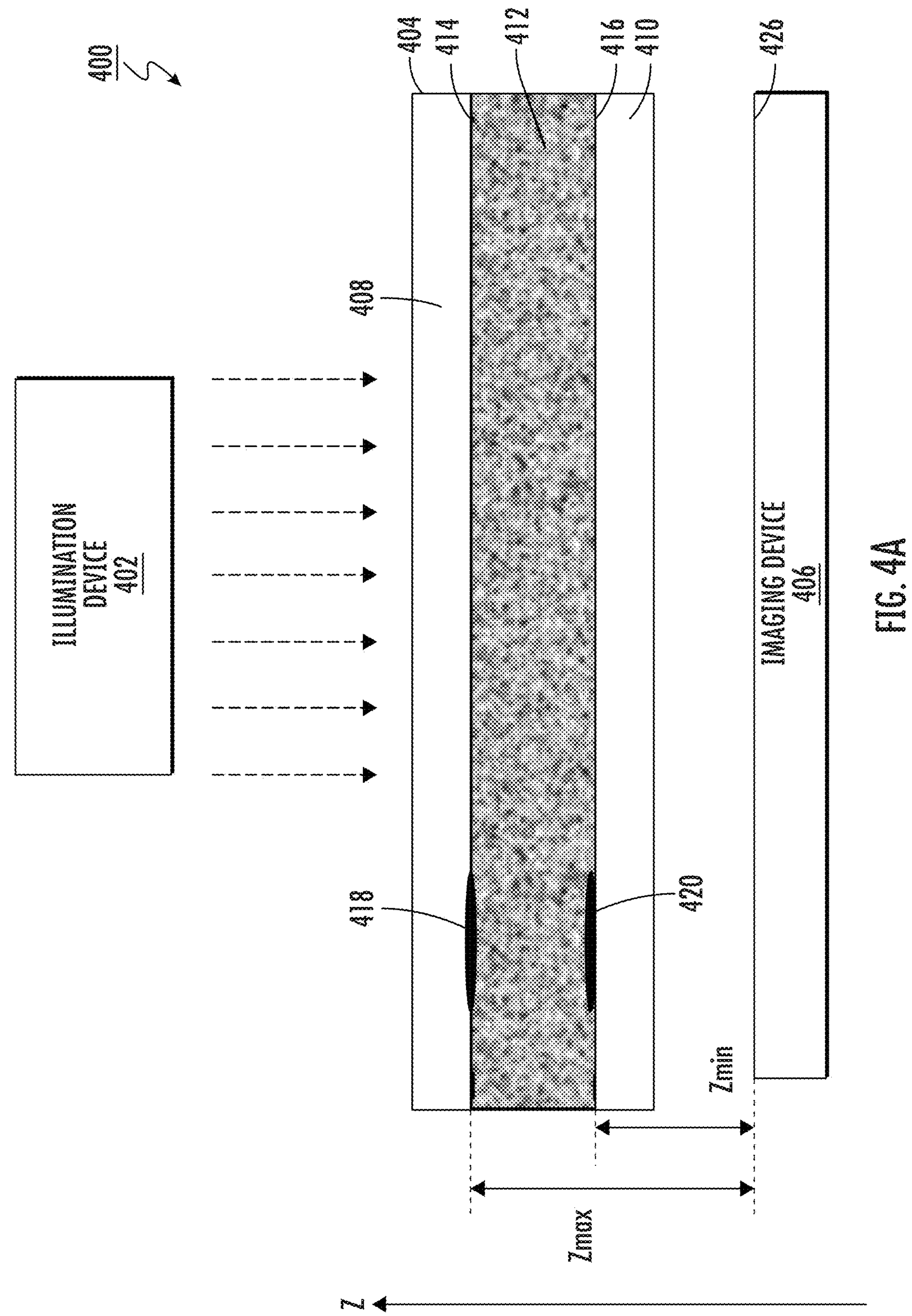
FIG. 4A is an example schematic representation of an example side view of an example fluid sample imaging system in accordance with some example embodiments described herein.
Figure 4B:
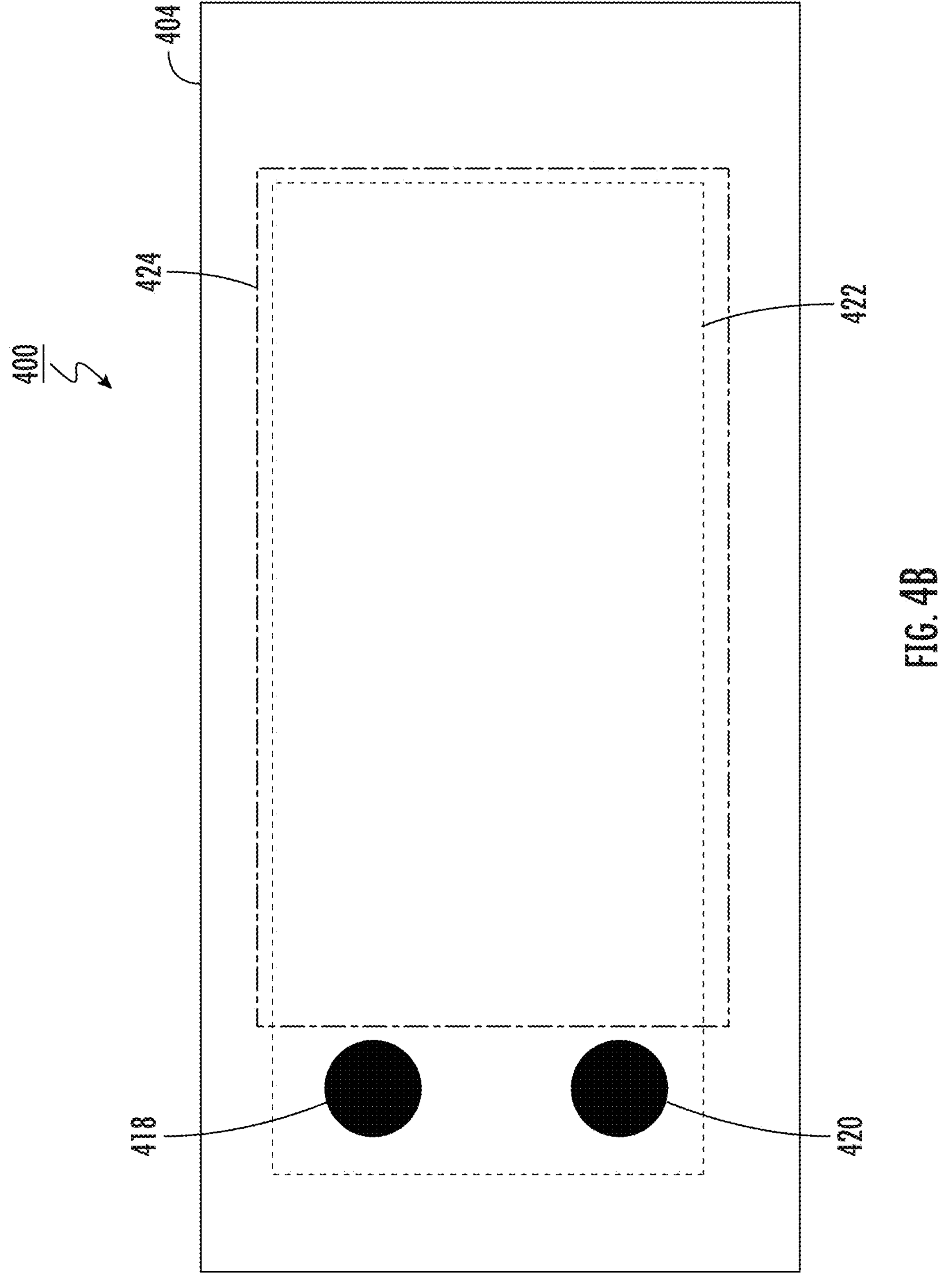
FIG. 4B is an example schematic representation of an example top view of an example fluid sample imaging system in accordance with some example embodiments described herein.

Referring now to FIG. 4A and FIG. 4B, example schematic representations of example views of an example fluid sample imaging system 400 are provided. In particular, FIG. 4A provides an example schematic representation of an example side view of the example fluid sample imaging system 400. FIG. 4B provides an example schematic representation of an example top view of the example fluid sample imaging system 400.

In the example shown in FIG. 4A, the fluid sample imaging system 400 comprises an illumination device 402, a flow chamber device 404, and an imaging device 406.

In some embodiments, the flow chamber device 404 comprises an upper flow chamber substrate 408 and a lower flow chamber substrate 410.

In some embodiments, the upper flow chamber substrate 408 may comprise transparent, semi-transparent, and/or translucent materials. For example, the upper flow chamber substrate 408 may comprise glass. Additionally, or alternatively, the upper flow chamber substrate 408 may comprise other material(s). In some embodiments, the upper flow chamber substrate 408 may comprise material(s) that allow light beams to pass through.

In some embodiments, the upper flow chamber substrate 408 may be in shape similar to a rectangular shape. For example, the upper flow chamber substrate 408 may be shaped similar to a microscope slide. Additionally, or alternatively, the upper flow chamber substrate 408 may be in other shapes.

Similarly, in some embodiments, the lower flow chamber substrate 410 may comprise transparent, semi-transparent, and/or translucent materials. For example, the lower flow chamber substrate 410 may comprise glass. Additionally, or alternatively, the lower flow chamber substrate 410 may comprise other material(s). In some embodiments, the lower flow chamber substrate 410 may comprise material(s) that allow light beams to pass through.

Similarly, in some embodiments, the lower flow chamber substrate 410 may be in shape similar to a rectangular shape. For example, the lower flow chamber substrate 410 may be shaped similar to a microscope slide. Additionally, or alternatively, the lower flow chamber substrate 410 may be in other shapes.

In some embodiments, the upper flow chamber substrate 408 is positioned above the lower flow chamber substrate 410. In some embodiments, the flow chamber device 404 may define a hollow portion that forms a flow channel. For example, the flow channel within the flow chamber device 404 may be in the form of a cavity that is between the upper flow chamber substrate 408 and the lower flow chamber substrate 410. In some embodiments, the flow channel provides a passageway for a fluid sample 412 to flow inside the flow chamber device 404. For example, the flow chamber device 404 may comprise an fluidic inlet that injects the fluid sample 412 into the flow channel of the flow chamber device 404, and may comprise a fluidic outlet where the fluid sample 412 may be discharged from the flow channel of the flow chamber device 404. In some embodiments, the flow chamber device is removable or replaceable. For example, the flow chamber device 404 can be replaced after each use.

In some embodiments, the fluid sample 412 may comprise PD effluent. In the present disclosure, the term "PD effluent" refers to a liquid that is discharged from a PD procedure. For example, the PD effluent may be a liquid that is discharged from a patient's body as an end product from performing a PD procedure on the patient. As described above, a dialysis solution is injected into the patient's body when a PD procedure is performed on the patient. The dialysis solution dwells within the patient's body and eventually is discharged as a PD effluent.

In some embodiments, the PD effluent may be received from a PD machine. For example, a discharging conduit of the PD machine that discharges fluids from the PD procedure can be connected to the flow channel of the flow chamber device 404. In such an example, the fluid discharged from the PD machine is the PD effluent. In some embodiments, the flow channel of the flow chamber device 404 may be connected to a fluid output conduit to discharge the PD effluent.

While the description above provides an example of a fluid sample, it is noted that the scope of the present disclosure is not limited to the description above. In some examples, an example fluid sample may comprise one or more additional and/or alternative fluids. For example, the fluid sample may comprise urine. Additionally, or alternatively, the fluid sample may comprise oil. Additionally, or alternatively, the fluid sample may comprise blood. Additionally, or alternatively, the fluid sample may comprise joint fluid.

In some embodiments, the example fluid sample imaging system 400 comprises at least one illumination device. In the example shown in FIG. 4A, an example illumination device 402 is illustrated.

For example, the illumination device 402 may be configured to produce, generate, emit, and/or trigger the production, generation, and/or emission of light. The example illumination device 402 may include, but is not limited to, laser diodes (for example, UV, visible, or IR laser diodes, edge-emitting laser diodes, surface-emitting laser diodes, and/or the like). Additionally, or alternatively, the illumination device 402 may comprise one or more light-emitting diodes (LEDs). Additionally, or alternatively, the illumination device 402 may comprise one or more other forms of natural and/or artificial sources of light.

In some embodiments, at least one illumination device is configured to emit at least one light beam. In some embodiments, the at least one light beam emitted by the at least one illumination device may comprise coherent light. In the present disclosure, the term "coherent light" refers to a light beam where the wavefront has a synchronized phase. Examples of coherent light include, but are not limited to, laser light. For example, the light beam in laser light has the same frequency and phase. In some embodiments, to emit coherent light, the at least one illumination device includes, but is not limited to, laser diodes (for example, UV, visible, or IR laser diodes, edge-emitting laser diodes, surface-emitting laser diodes, and/or the like).

In some embodiments, the at least one light beam emitted by the at least one illumination device may comprise incoherent light or at least partially incoherent light. In the present disclosure, the term "incoherent light" (or "low coherence light" as used interchangeably herein) refers to a light beam where the wavefront does not have a synchronized phase. For example, incoherent light does not contain photons with the same frequency and does not have wavelengths that are in phase with one another. In some embodiments, to emit incoherent light, the at least one illumination device includes, but is not limited to, light-emitting diodes (LEDs).

In some embodiments, the illumination device 402 is positioned above the flow chamber device 404. For example, the illumination device 402 is positioned above the upper flow chamber substrate 408 of the flow chamber device 404.

In some embodiments, at least one light beam emitted by the illumination device 402 is directed to a top surface of the flow chamber device 404 (for example, to the upper flow chamber substrate 408 of the flow chamber device 404). As described above, the upper flow chamber substrate 408 of the flow chamber device 404 may comprise transparent material, and the flow channel of the flow chamber device 404 may receive a fluid sample 412. In some embodiments, at least one light beam from the illumination device 402 passes through the fluid sample 412 in the flow channel of the flow chamber device 404 after passing through the upper flow chamber substrate 408 of the flow chamber device 404.

As described above, the flow chamber device 404 also comprises a lower flow chamber substrate 410. In some embodiments, the at least one light beam from the illumination device 402 passes through the lower flow chamber substrate 410 of the flow chamber device 404 after passing through the fluid sample 412 in the flow channel of the flow chamber device 404. Because the lower flow chamber substrate 410 comprises transparent material, the at least one light beam emitted by the illumination device 402 passes through the lower flow chamber substrate 410 without being blocked by the lower flow chamber substrate 410.

In some embodiments, the imaging device 406 is positioned under the flow chamber device 404. For example, the imaging device 406 may be positioned under the lower flow chamber substrate 410 of the flow chamber device 404. In such an example, the image sensing surface 426 of the imaging device 406 (for example, a sensing surface of imagers and/or image sensors described herein) is positioned under the lower flow chamber substrate 410 of the flow chamber device 404 to receive the at least one light beam from the illumination device 402 after it passes through the lower flow chamber substrate 410.

For example, the illumination device 402 is aligned to flow chamber device 404 and to the imaging device 406. The at least one light beam emitted by the illumination device 402 may enter the flow chamber device 404 via the upper flow chamber substrate 408 of the flow chamber device 404. Because the upper flow chamber substrate 408 comprises transparent materials, the at least one light beam travels through the fluid sample 412 in the flow channel of the flow chamber device 404, and then exits the flow chamber device 404 via the lower flow chamber substrate 410 of the flow chamber device 404. Because the flow chamber device 404 is aligned to the imaging device 406, the at least one light beam emitted by the illumination device 402 then enters the imaging device 406 (for example, the image sensing surface 426 of the imaging device 406).

In some embodiments, the imaging device 406 comprises an image sensor that generates digital holography image data associated with the fluid sample 412 in the flow channel of the flow chamber device 404.

In the present disclosure, the term "digital holography image data" refers to image data that is generated based on digital holography techniques, including, but not limited to, lensless holography techniques. For example, the digital holography image data may be generated by the image sensor without any imaging lenses and without any adjustments. In such an example, there are no imaging lenses between the bottom surface of the flow chamber device 404 and the image sensor. The digital holography image data may comprise a digital holography image of the fluid sample 412 (for example, a digital holography image of various particles, cells, etc. in the fluid sample 412). In some embodiments, the digital holography image is blurry and/or out of focus, and example embodiments of the present disclosure may generate focused images associated with the fluid sample 412 based at least in part on the digital holography image, details of which are described herein.

In some examples, the image sensor may comprise one or more imagers and/or image sensors. Various examples of the image sensor may include, but are not limited to, a charge-coupled device (CCD), a complementary metal-oxide semiconductor (CMOS) sensor, and/or the like. As described above, in some embodiments, the image sensor does not comprise any lenses so as to generate digital holography image data based on lensless holography techniques.

While the description above provides an example of implementing digital holography techniques, it is noted that the scope of the present disclosure is not limited to the description above. In some examples, an example fluid sample imaging system may implement other imaging techniques. For example, example embodiments of the present disclosure may implement optical microscopy as the imaging technique. Additionally, or alternatively, example embodiments of the present disclosure may implement ultraviolet (UV) fluorescence as the imaging technique.

While the description above provides an example positional arrangement between the illumination device 402 and the flow chamber device 404 and an example positional arrangement between the flow chamber device 404 and the imaging device 406, it is noted that the scope of the present disclosure is not limited to the description above. In some examples, the illumination device, the flow chamber device, and/or the imaging device of an example fluid sample imaging system may be positioned differently than those shown in FIG. 4A. For example, the illumination device may be positioned under the flow chamber device, and the imaging device may be positioned above the flow chamber device.

Referring back to FIG. 4A, the flow chamber device 404 further comprises/defines an upper surface 414 and a lower surface 416.

In some embodiments, the upper surface 414 corresponds to a surface of the upper flow chamber substrate 408 that is in contact with the fluid sample 412 (for example, a bottom surface of the upper flow chamber substrate 408 and/or an upper inner surface of the flow channel of the flow chamber device 404).

In some embodiments, the lower surface 416 corresponds to the surface of the lower flow chamber substrate 410 that is in contact with the fluid sample 412 (for example, a top surface of the lower flow chamber substrate 410 and/or a lower inner surface of the flow channel of the flow chamber device 404).

As shown in FIG. 4A, a maximum focal depth Zmax may be associated with the positional relationship between the upper surface 414 of the flow chamber device 404 and the imaging device 406, and a minimum focal depth Zmin may be associated with the positional relationship between the lower surface 416 of the flow chamber device 404 and the imaging device 406.

In the present disclosure, the term "focal depth" refers to a distance between an object (for example, a particle/cell of interest in the fluid sample 412) and an image sensing surface of an imaging device (for example, the image sensing surface 426 of the imaging device 406) in the depth Z dimension (e.g. a longitudinal dimension that is perpendicular to the image sensing surface of the imaging device).

In some embodiments, the maximum focal depth Zmax corresponds to a first focal depth between the upper surface 414 of the flow chamber device 404 and the imaging device 406 (for example, the image sensing surface 426 of the imaging device 406). As described above, the upper surface 414 corresponds to a surface of the upper flow chamber substrate 408 that is in contact with the fluid sample 412. In some embodiments, the minimum focal depth Zmin corresponds to a second focal depth between the lower surface 416 of the flow chamber device 404 and the imaging device 406 (for example, the image sensing surface 426 of the imaging device 406).

As described above and illustrated in FIG. 4A, the fluid sample 412 flows between the upper surface 414 and the lower surface 416 of the flow chamber device 404, and the imaging device 406 is positioned under the flow chamber device 404. As such, the maximum focal depth Zmax indicates a maximum focal distance between the fluid sample 412 in the flow chamber device 404 and the imaging device 406 (for example, the image sensing surface 426 of the imaging device 406), and the minimum focal depth Zmin indicates a minimum focal distance between the fluid sample 412 in the flow chamber device 404 and the imaging device 406 (for example, the image sensing surface 426 of the imaging device 406).

In some embodiments, the flow chamber device 404 comprises an upper reference mark 418 and a lower reference mark 420.

In some embodiments, the upper reference mark 418 is disposed on the upper surface 414 of the flow chamber device 404. As described above, the focal depth between the upper surface 414 of the flow chamber device 404 and the imaging device 406 (for example, the image sensing surface 426 of the imaging device 406) corresponds to the maximum focal depth Zmax. As such, the upper reference mark 418 is positioned at the maximum focal depth Zmax in the depth Z dimension.

In some embodiments, the lower reference mark 420 is disposed on the lower surface 416 of the flow chamber device 404. As described above, the focal depth between the lower surface 416 of the flow chamber device 404 and the imaging device 406 (for example, the image sensing surface 426 of the imaging device 406) corresponds to the minimum focal depth Zmin. As such, the lower reference mark 420 is positioned at the minimum focal depth Zmin in the depth Z dimension.

While the description above provides example positions of the upper reference mark and the lower reference mark in the depth Z dimension, it is noted that the scope of the present disclosure is not limited to the description above. In some embodiments, example upper reference marks and/or example lower reference marks may be positioned at various other Z positions.

In some embodiments, materials, sizes, and shapes of the upper reference mark 418 and the lower reference mark 420 can provide various technical advantages and benefits.

In some embodiments, the upper reference mark 418 and the lower reference mark 420 comprise opaque material. For example, the upper reference mark 418 and/or the lower reference mark 420 may comprise ink imprinted on the upper surface 414 and the lower surface 416, respectively. Additionally, or alternatively, the upper reference mark 418 and the lower reference mark 420 may comprise additional and/or alternative material(s). In some embodiments, the opaque material of the upper reference mark 418 and the lower reference mark 420 provides technical advantages and benefits including, but not limited to, enabling the ASP-based image focusing algorithm to identify the upper reference mark 418 and the lower reference mark 420 from the digital holography image data, details of which are described herein.

While the description above provides some example materials associated with the upper reference mark and the lower reference mark, it is noted that the scope of the present disclosure is not limited to the description above. For example, the upper reference mark and/or the lower reference mark may be in the form of laser-engraved markings on the upper surface 414 and the lower surface 416, respectively. In such an example, the laser-engraved markings comprise opaque surfaces that provide contrast to transparent, semi-transparent, and/or translucent upper surface 414 and/or the lower surface 416.

In some embodiments, the upper reference mark 418 and/or the lower reference mark 420 have sharp (for example, high contrast) edges. In some embodiments, the sharp edges of the upper reference mark 418 and/or the lower reference mark 420 may provide various technical advantages and benefits such as, but not limited to, allowing the upper reference mark 418 and/or the lower reference mark 420 to be more accurately and quickly identified from the digital holography image data, details of which are described herein.

In some embodiments, the upper reference mark 418 and/or the lower reference mark 420 may be in geometric shapes or other unique shapes (including, but are not limited to, alpha-numeric shapes). For example, the upper reference mark 418 and/or the lower reference mark 420 may be in the form of or comprise a serial number and/or media authentication markings. Such example shapes of the upper reference mark 418 and/or the lower reference mark 420 may provide technical advantages and benefits such as, but not limited to, allowing the flow chamber device 404 to be authenticated, details of which are described herein.

In some embodiments, the upper reference mark 418 and/or the lower reference mark 420 may be in regular shapes (such as, but not limited to, triangular shapes, rectangular shapes, and/or the like). Such example shapes of the upper reference mark 418 and/or the lower reference mark 420 may simplify edge detection by the ASP-based image focusing algorithm and/or size estimation of the particles of interest, details of which are described herein.

While the upper reference mark 418 and the lower reference mark 420 illustrated in FIG. 4A and FIG. 4B are in circular shapes, it is noted that the scope of the present disclosure is not limited to these examples.

In some embodiments, the thickness of the upper reference mark 418 and the thickness of the lower reference mark 420 are less than or equal 1 micron. Such example thickness provides technical advantage and benefits such as, but not limited to, providing well-defined Z values for the upper reference mark 418 and the lower reference mark 420 in the depth Z dimension.

Referring now to FIG. 4B, an example schematic representation of an example top view of the example fluid sample imaging system 400 is illustrated. In particular, FIG. 4B illustrates an example full field of view 422 of the imaging device 406 and a relevant field of view 424 associated with the imaging device 406.

In some embodiments, the full field of view 422 of the imaging device 406 corresponds to the entire field of view of the imaging device 406 (for example, the field of view of the image sensing surface 426 of the imaging device 406). In some embodiments, the full field of view 422 of the imaging device 406 may capture the entirety of the flow channel of the flow chamber device 404 or most of the flow channel of the flow chamber device 404.

In some embodiments, the relevant field of view 424 of the imaging device 406 corresponds to a field of view that captures particles/cells of interest in the fluid sample 412 from the flow channel of the flow chamber device 404. For example, as shown in FIG. 4B, the relevant field of view 424 of the imaging device 406 is a portion of the full field of view 422 of the imaging device 406 that does not comprise the upper reference mark 418 and the lower reference mark 420.

In some embodiments, a size of the upper reference mark 418 (including the width and/or the height of the upper reference mark 418) and/or a size of the lower reference mark 420 (including the width and/or the height of the lower reference mark 420) are larger than a size of the particle/cell of interest (including the width and/or the height of the particles/cells of interest). In some embodiments, a size of the upper reference mark 418 (including the width and/or the height of the upper reference mark 418) and/or a size of the lower reference mark 420 (including the width and/or the height of the lower reference mark 420) are smaller than a height of the full field of view 422 of the imaging device 406 (or a width of the full field of view 422 of the imaging device 406).

The example size of the upper reference mark 418 and the example size of the lower reference mark 420 described above can provide various technical advantages and benefits. For example, having the size of the upper reference mark 418 and the size of the lower reference mark 420 larger than the size of the particles/cells of interest allows the imaging device 406 to detect image signals associated with the upper reference mark 418 and the lower reference mark 420 when generating the digital holography image data, even if the upper reference mark 418 or the lower reference mark 420 are obstructed by particles/cells of interest from the fluid sample 412 in the flow chamber device 404. As another example, the upper reference mark 418 and the lower reference mark 420 obstruct and effectively reduce the relevant field of view 424 of the imaging device 406 (and, therefore, reducing the effective fluid volume for a single hologram image). As such, having the size of the upper reference mark 418 and/or the size of the lower reference mark 420 smaller than a height of the full field of view 422 of the imaging device 406 (or a width of the full field of view 422 of the imaging device 406) prevents the upper reference mark 418 and the lower reference mark 420 from obstructing too much of the field of view of the imaging device 406.

As an example, the size of the upper reference mark 418 and the size of the lower reference mark 420 are larger than the cell size of white blood cells (for example, larger than approximately 12 microns to 15 microns), and are smaller than the height of the full field of view 422 of the imaging device 406 (for example, smaller than approximately 3 millimeters). In some embodiments, the size of the upper reference mark 418 and the size of the lower reference mark 420 may be ten times the cell size of the white blood cell (for example, approximately between 120 microns and 150 microns).

While the description above provides some example sizes of the upper reference mark 418 and the lower reference mark 420, it is noted that the scope of the present disclosure is not limited to the description above.

As illustrated and described above in connection with FIG. 4A, the upper reference mark 418 is on the upper inner surface of the flow channel of the flow chamber device 404, and the lower reference mark 420 is on the lower inner surface of the flow channel of the flow chamber device 404. As illustrated in FIG. 4B, both the upper reference mark 418 and the lower reference mark 420 are within the full field of view 422 of the imaging device 406.

In some embodiments, each of the upper reference mark 418 and/or the lower reference mark 420 may be positioned on a side or a corner of the full field of view 422 of the imaging device 406. Positioning them on the side and/or the corner of the full field of view 422 of the imaging device 406 provides technical advantages and benefits such as, but not limited to, allowing the upper reference mark 418 and the lower reference mark 420 to be more easily identified from the digital holography image data.

In some embodiments, the upper reference mark 418 and the lower reference mark 420 do not overlap in the transverse dimensions (e.g. the X dimension and the Y dimension). In other words, the upper reference mark 418 and the lower reference mark 420 do not overlap in dimensions that are parallel to the image sensing surface of the imaging device 406. As such, the image sensing surface of the imaging device 406 can capture separate image data of the upper reference mark 418 and of the lower reference mark 420.

The upper reference mark and the lower reference mark described herein provide various technical benefits and advantages. For example, the upper reference mark and the lower reference mark enable determining the maximum focal depth and the minimum focal depth that can be used to calibrate the ASP-based image focusing algorithm. In situations where the fluid sample is very clean (e.g. a low concentration of cells), the reference marks would establish focal depth information that may not be able to be extracted from the cell/particle characteristics alone. For example, PD effluent is generally free of particles/cells in patients without infection, and the upper reference mark and the lower reference mark can provide technical advantages in calibrating the ASP-based image focusing algorithm. Additionally, or alternatively, the upper reference mark and the lower reference mark can establish a reference frame for determining position and/or movement of particles/cells of interest in subsequent images. In other words, the position and/or movement of particles/cells of interest in the fluid sample from different images can be determined based on comparing the locations of the upper reference mark in different images and/or comparing the locations of the lower reference mark in different images.

Referring now to FIG. 5, FIG. 6, FIG. 7 and FIG. 8, example flow diagrams illustrating example methods of analyzing fluid samples in accordance with some example embodiments of the present disclosure are provided.

It is noted that each block of the flowchart, and combinations of blocks in the flowchart, may be implemented by various means such as hardware, firmware, circuitry and/or other devices associated with execution of software including one or more computer program instructions. For example, one or more of the steps/operations described in FIG. 5, FIG. 6, FIG. 7 and FIG. 8 may be embodied by computer program instructions, which may be stored by a non-transitory memory of an apparatus employing an embodiment of the present disclosure and executed by a processor component in an apparatus (such as, but not limited to, a fluid sample imaging system, a mobile computing device, a remote computing server, and/or the like). For example, these computer program instructions may direct the processor component to function in a particular manner, such that the instructions stored in the computer-readable storage memory produce an article of manufacture, the execution of which implements the function specified in the flowchart block(s).

As described above and as will be appreciated based on this disclosure, embodiments of the present disclosure may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Similarly, embodiments may take the form of a computer program code stored on at least one non-transitory computer-readable storage medium. Any suitable computer-readable storage medium may be utilized including non-transitory hard disks, CD-ROMs, flash memory, optical storage devices, or magnetic storage devices.

Figure 5:
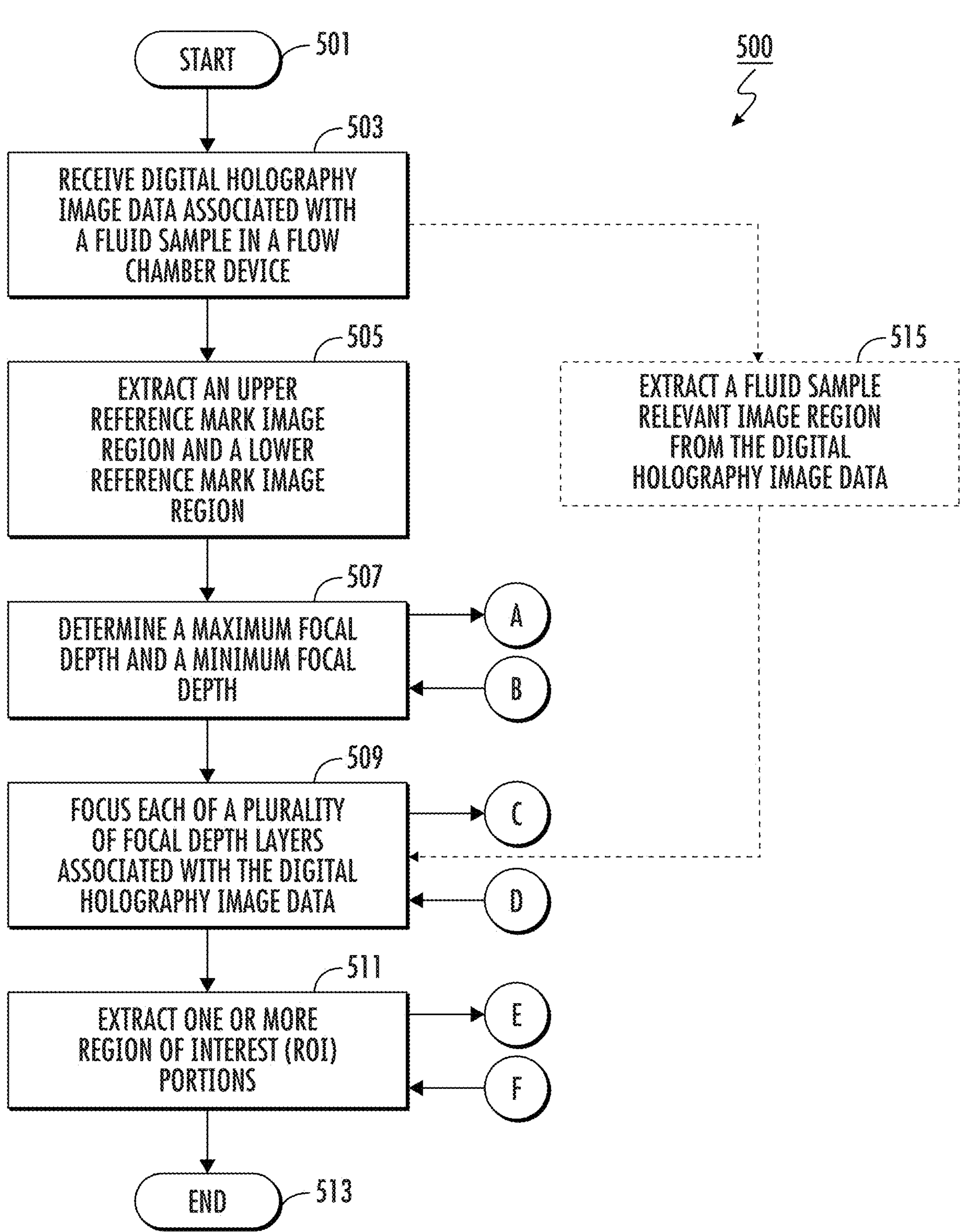
FIG. 5 is an example flow diagram illustrating an example method for analyzing fluid samples in accordance with some example embodiments described herein.

Referring now to FIG. 5, an example method 500 of analyzing fluid samples in accordance with some example embodiments described herein is illustrated. In particular, FIG. 5 illustrates an example method for analyzing digital holography image data associated with fluid samples.

In FIG. 5, the example method 500 starts at step/operation 501. In some embodiments, subsequent to and/or in response to step/operation 501, the example method 500 proceeds to step/operation 503. At step/operation 503, a processor component (such as, but not limited to, the processor component 301 of the example remote computing server 105 described above in connection with at least FIG. 1 and FIG. 3, and/or the processor component 208 of the example mobile computing device 101A described in connection with at least FIG. 1 and FIG. 2) receives digital holography image data associated with a fluid sample in a flow chamber device.

In some embodiments, the digital holography image data is received from an imaging device (such as, but not limited to, the imaging device 406 of the fluid sample imaging system 400 described above in connection with FIG. 4A and FIG. 4B.

Similar to described above in connection with FIG. 4A and FIG. 4B, the imaging device may be positioned under a flow chamber device. In some embodiments, the flow chamber device receives a fluid sample, and the digital holography image data generated by the imaging device is associated with the fluid sample in the flow chamber device.

In some embodiments, the flow chamber device comprises an upper reference mark that is on an upper surface of the flow chamber device (similar to the upper reference mark 418 described above in connection with FIG. 4A and FIG. 4B) and a lower reference mark that is on a lower surface of the flow chamber device (similar to the lower reference mark 420 described above in connection with FIG. 4A and FIG. 4B). As such, the digital holography image data generated by the imaging device is associated with the upper reference mark and the lower reference mark of the flow chamber device.

In some embodiments, the digital holography image data comprises image data of the entire field of view of the imaging device (for example, the full field of view 422 of the imaging device 406 as shown above in connection with FIG. 4B). As described above, the digital holography image data may comprise a digital holography image of the fluid sample, the upper reference mark, and the lower reference mark. In some embodiments, the digital holography image is out of focus or blurry.

Referring back to FIG. 5, subsequent to and/or in response to step/operation 503, the example method 500 proceeds to step/operation 505. At step/operation 505, a processor component (such as, but not limited to, the processor component 301 of the example remote computing server 105 described above in connection with at least FIG. 1 and FIG. 3, and/or the processor component 208 of the example mobile computing device 101A described in connection with at least FIG. 1 and FIG. 2) extracts an upper reference mark image region and a lower reference mark image region.

In some embodiments, the upper reference mark image region is associated with the upper reference mark, and the lower reference mark image region is associated with the lower reference mark. In some embodiments, the upper reference mark image region is extracted from the digital holography image data based at least in part on an upper reference mark location associated with the upper reference mark, and the lower reference mark image region is extracted from the digital holography image data based at least in part on a lower reference mark location associated with the lower reference mark.

For example, the digital holography image data may comprise a digital holography image as described above. In some embodiments, the processor component may determine the locations of the upper reference mark and the lower reference mark in the digital holography image. For example, the upper reference mark and/or the lower reference mark may be positioned on a side and/or a corner of the full field of view of the imaging device as described above. In such an example, the processor component may determine the corresponding side or the corresponding corner of the full field of view where the upper reference mark is located as the upper reference mark location, and may determine the corresponding side or the corresponding corner of the full field of view where the lower reference mark is located as the lower reference mark location.

In some embodiments, the processor component may extract/crop the upper reference mark image region around the upper reference mark location from the digital holography image, and may extract/crop the lower reference mark image region around the lower reference mark location from the digital holography image.

In some embodiments, a size of upper reference mark image region (for example, a height of the upper reference mark image region or a width of the upper reference mark image region) and/or a size of lower reference mark image region (for example, a height of the lower reference mark image region or a width of the lower reference mark image region) may be selected according to an image focusing algorithm (such as an ASP-based image focusing algorithm), such that the upper reference mark image region and the lower reference mark image region provide sufficient sizes to enable the image focusing algorithm to generate focused images of the upper reference mark and the lower reference mark. Additionally, or alternatively, the size of the upper reference mark image region and/or the size of the lower reference mark image region may account for the mechanical variations (within tolerance) associated with the flow chamber device.

Referring back to FIG. 5, subsequent to and/or in response to step/operation 505, the example method 500 proceeds to step/operation 507. At step/operation 507, a processor component (such as, but not limited to, the processor component 301 of the example remote computing server 105 described above in connection with at least FIG. 1 and FIG. 3, and/or the processor component 208 of the example mobile computing device 101A described in connection with at least FIG. 1 and FIG. 2) determines a maximum focal depth and a minimum focal depth.

In some embodiments, the maximum focal depth and the minimum focal depth are associated with the digital holography image data received at step/operation 503.

Similar to those described above in connection with at least FIG. 4A and FIG. 4B, the maximum focal depth indicates a maximum distance between the fluid sample and the imaging device, and the minimum focal depth indicates a minimum distance between the fluid sample and the imaging device.

For example, the maximum focal depth corresponds to a first focal depth between the upper surface of the flow chamber device and the imaging device. In some embodiments, the upper surface of the flow chamber device corresponds to the upper inner surface of the flow channel in the flow chamber device. Because the imaging device is positioned under the flow channel of the flow chamber device, when a volume of fluid sample flows through the flow channel, the upper surface of the flow chamber device corresponds to a depth in the Z dimension where the fluid sample is the furthest away from the imaging device. As such, the maximum focal depth indicates a maximum focal depth between the imaging device and the volume of fluid sample.

Similarly, the minimum focal depth corresponds to a second focal depth between the lower surface of the flow chamber device and the imaging device. In some embodiments, the lower surface of the flow chamber device corresponds to the lower inner surface of the flow channel in the flow chamber device. Because the imaging device is positioned under the flow channel of the flow chamber device, when a volume of fluid sample flows through the flow channel, the lower surface of the flow chamber device corresponds to a depth in the Z dimension where the fluid sample is the closest to the imaging device. As such, the minimum focal depth indicates a minimum focal depth between the imaging device and the volume of fluid sample.

In some embodiments, the processor component determines the maximum focal depth and the minimum focal depth based at least in part on the upper reference mark image region and the lower reference mark image region, respectively, that are extracted at step/operation 505. In some embodiments, the processor component may separately provide the upper reference mark image region and the lower reference mark image region to an image focusing algorithm, and the image focusing algorithm may determine the maximum focal depth and the minimum focal depth, respectively.

In the present disclosure, the term "image focusing algorithm" refers to a computer software program (and, in some embodiments, associated computer hardware such as memory and processor components) that receives an out of focus image (such as, but not limited to, the digital holography image from the digital holography image data) and computationally generates an optimally focused image based on the out of focus image. For example, the image focusing algorithm may process the out of focus image and generate a series of images, where each of the series of images is associated with a different computational focal depth. Additionally, in some embodiments, the image focusing algorithm selects an image from the series of images that is best in focus, and outputs the selected image.

For example, the processor component may implement an image focusing algorithm on the upper reference mark image region to focus the upper reference mark image region and determine the maximum focal depth. In such an example, the image focusing algorithm may generate a focused image based on the upper reference mark image region, where the upper reference mark is optimally focused in the focused image. Because the upper reference mark is on the upper surface of the flow chamber device, the focal depth associated with the focused image corresponds to the maximum focal depth. In other words, the processor component can determine the maximum focal depth between the imaging device and the volume of fluid sample by implementing the image focusing algorithm on the upper reference mark image region.

Separately, the processor component may implement an image focusing algorithm on the lower reference mark image region to focus the lower reference mark image region and determine the minimum focal depth. In such an example, the image focusing algorithm may generate a focused image based on the lower reference mark image region, where the lower reference mark is optimally focused in the focused image. Because the lower reference mark is on the lower surface of the flow chamber device, the focal depth associated with the focused image corresponds to the minimum focal depth. In other words, the processor component can determine the minimum focal depth between the imaging device and the volume of fluid sample by implementing the image focusing algorithm on the lower reference mark image region.

Figure 6:
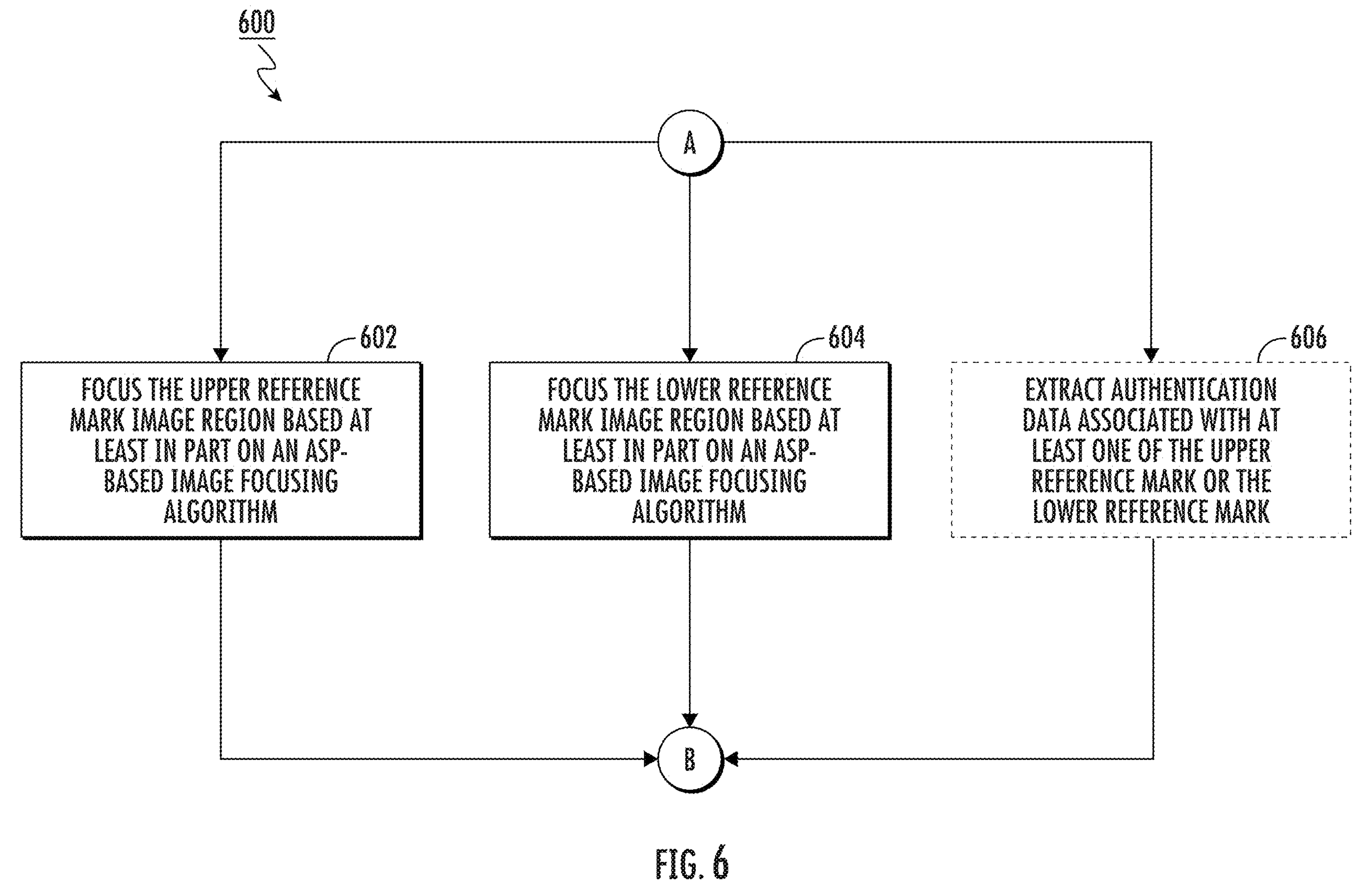
FIG. 6 is an example flow diagram illustrating example steps/operations associated with an example method for analyzing fluid samples in accordance with some example embodiments described herein.

In some embodiments, the processor component may separately focus the upper reference mark image region and the lower reference mark image region with an ASP-based image focusing algorithm to determine depth Z dimension values for focal depths of the upper reference mark and the lower reference mark, details of which are described herein in connection with at least FIG. 6.

While the description above provides an example of determining the maximum focal depth and the minimum focal depth based at least in part on extracting the upper and lower reference mark image regions and focusing the upper and lower reference mark image regions, it is noted that the scope of the present disclosure is not limited to the description above.

For example, additionally, or alternatively, an example processor component may implement an image focusing algorithm on the digital holography image data. In such an example, the image focusing algorithm may focus the entire digital holography image from the digital holography image data. Subsequently, the processor component may determine an upper reference mark location associated with the upper reference mark from the focused image, generate a focused image where the upper reference mark is optimally focused, and determine a maximum focal depth based on the focused image, similar to those described above. Additionally, or alternatively, the processor component may determine a lower reference mark location associated with the lower reference mark from the focused image, generate a focused image where the lower reference mark is optimally focused, and determine a minimum focal depth based on the focused image.

While the description above provides some example technical benefits and advantages of implementing the upper reference mark and the lower reference mark, it is noted that the scope of the present discourse is not limited to the examples described above.

For example, in some embodiments, the processor component may determine whether the upper reference mark can be resolved/identified in the upper reference mark image region, and whether the lower reference mark can be resolved/identified in the lower reference mark image region. As described above, the upper reference mark image region is extracted/cropped from the digital holography image around the expected location of the upper reference mark, and the lower reference mark image region is extracted/cropped from the digital holography image around the expected location of the lower reference mark. If the upper reference mark cannot be resolved/identified in the upper reference mark image region, and/or the lower reference mark cannot be resolved/identified in the lower reference mark image region, the processor component may determine that the flow chamber device is not aligned correctly with the imaging device, the fluid sample is too opaque, and/or the flow chamber device is an unauthenticated or authorized device (for example, a counterfeit). As such, the upper reference mark and the lower reference mark can provide a useful diagnostic indicator.

As another example, the upper reference mark and the lower reference mark are each associated with reference mark sizes as described above. In some embodiments, the sizes of the upper reference mark and the lower reference mark can be used to calibrate the scale of dimensions in a digital hologram reconstructed based on the digital holography image data. For example, the processor component may compare the actual sizes of the upper reference mark and the lower reference mark with image sizes of the upper reference mark and the lower reference mark in the digital holography image or the focused image based on the digital holography image. The processor component may then scale the particles/cells of interest in the digital holography image or the focused image based on the comparison, so that the actual sizes of the particles/cells of interest can be determined.

Referring back to FIG. 5, subsequent to and/or in response to step/operation 507, the example method 500 proceeds to step/operation 509. At step/operation 509, a processor component (such as, but not limited to, the processor component 301 of the example remote computing server 105 described above in connection with at least FIG. 1 and FIG. 3, and/or the processor component 208 of the example mobile computing device 101A described in connection with at least FIG. 1 and FIG. 2) focuses each of a plurality of focal depth layers associated with the digital holography image data.

In some embodiments, the processor component may determine the plurality of focal depth layers associated with the digital holography image data based at least in part on the maximum focal depth and the minimum focal depth determined at step/operation 507. In some embodiments, each of the plurality of focal depth layers is associated with a focal depth range/segment. Additional details associated with determining the plurality of focal depth layers are described in connection with at least FIG. 7.

Subsequently, the processor component may focus each of a plurality of focal depth layers by implementing an image focusing algorithm. For example, the processor component may implement an ASP-based image focusing algorithm to focus each of the plurality of focal depth layers associated with the digital holography image data.

For example, the processor component may provide the digital holography image from the digital holography image data to the image focusing algorithm, along with the focal depth range associated with a focal depth layer. In some embodiments, the image focusing algorithm may computationally focus the digital holography image at different focal depths in the focal depth range to generate a series of images for the focal depth layer, where each of the series of images is associated with a different focal depth within the focal depth range.

In some embodiments, the image focusing algorithm may select an optimally focused image from the series of images for the focal depth layer, similar to those described above. In such embodiments, the focused image generated by the image focusing algorithm is associated with a focal depth within the focal depth layer that provides the optimum focus of particles/cells of interest as compared to other focal depths within the focal depth layer.

Referring back to FIG. 5, subsequent to and/or in response to step/operation 509, the example method 500 proceeds to step/operation 511. At step/operation 511, a processor component (such as, but not limited to, the processor component 301 of the example remote computing server 105 described above in connection with at least FIG. 1 and FIG. 3, and/or the processor component 208 of the example mobile computing device 101A described in connection with at least FIG. 1 and FIG. 2) extracts one or more region of interest (ROI) portions.

In some embodiments, the processor component may extract one or more ROI portions from the plurality of focal depth layers. For example, as described above in connection with at least step/operation 509, the processor component may generate an optimally focused image or a series of images for each of the plurality of focal depth layers, and the processor component may extract the one or more ROI portion from the optimally focused images or the series of images associated with the plurality of focal depth layers.

In some embodiments, a ROI portion is associated with the fluid sample (e.g. associated with particle(s)/cell(s) of interest in the fluid sample). For example, the ROI portion may comprise image(s) of particle(s)/cell(s) of interest from the fluid sample. As an example, the fluid sample may be in the form of a PD effluent. In such an example, the ROI portions may comprise images of white blood cells in the PD effluent. As such, the processor component may extract optimally focused particle/cell ROI portions for the white blood cells from each focus layer.

Referring back to FIG. 5, subsequent to and/or in response to step/operation 511, the example method 500 proceeds to step/operation 513 and ends.

In some embodiments, subsequent to and/or in response to step/operation 503, the example method 500 optionally proceeds to step/operation 515. At step/operation 515, a processor component (such as, but not limited to, the processor component 301 of the example remote computing server 105 described above in connection with at least FIG. 1 and FIG. 3, and/or the processor component 208 of the example mobile computing device 101A described in connection with at least FIG. 1 and FIG. 2) extracts a fluid sample relevant image region from the digital holography image data.

In some embodiments, the upper reference mark and the lower reference mark are excluded from the fluid sample relevant image region that is extracted at step/operation 515. For example, the fluid sample relevant image region from the digital holography image data may correspond to the relevant field of view 424 associated with the imaging device 406 illustrated and described above in connection with FIG. 4A and FIG. 4B.

In some embodiments, extracting the fluid sample relevant image region from the digital holography image data may provide various technical benefits and advantages. For example, the fluid sample relevant image region may provide a useful image area of field of view for cell/particle analysis of the fluid sample. Because the fluid sample relevant image region does not comprise images of the reference marks, the processor component may implement the image focusing algorithm to focus the fluid sample relevant image region without having to processing other image regions that may not be relevant to the cell/particle analysis of the fluid sample, which can increase the speed of processing digital holography image data.

For example, in some embodiments, the plurality of focal depth layers described above in connection with step/operation 509 and step/operation 511 are associated with the fluid sample relevant image region extracted at step/operation 515. At step/operation 509, when focusing each of a plurality of focal depth layers associated with the digital holography image data, the processor component may provide only the fluid sample relevant image region from the digital holography image data to the image focusing algorithm, along with the focal depth range associated with a focal depth layer. In some embodiments, the image focusing algorithm may computationally focus only the fluid sample relevant image region at different focal depths in the focal depth range to generate a series of images for the focal depth layer, where each of the series of images is associated with a different focal depth within the focal depth range. In some embodiments, the image focusing algorithm may select an optimally focused image (e.g. of the fluid sample relevant image region) from the series of images for the focal depth layer, similar to those described above. Subsequently, the processor component may extract the one or more ROI portions at step/operation 511 from the focused images or the series of images, similar to those described above.

Referring now to FIG. 6, an example method 600 of analyzing fluid samples in accordance with some example embodiments described herein is illustrated. In particular, the example method 600 illustrates some example additional and/or alternative steps/operations associated with determining a maximum focal depth and a minimum focal depth in an example method for analyzing fluid samples (for example, associated with step/operation 507 described above in connection with FIG. 5) in accordance with some embodiments of the present disclosure.

In the example shown in FIG. 6, the example method 600 starts at block A. As illustrated in FIG. 5, block A is connected to step/operation 507, where the processor component determines a maximum focal depth and a minimum focal depth.

In some embodiments, subsequent to block A, the example method 600 proceeds to step/operation 602. At step/operation 602, a processor component (such as, but not limited to, the processor component 301 of the example remote computing server 105 described above in connection with at least FIG. 1 and FIG. 3, and/or the processor component 208 of the example mobile computing device 101A described in connection with at least FIG. 1 and FIG. 2) focuses the upper reference mark image region based at least in part on an Angular Spectrum Propagation (ASP) based image focusing algorithm.

In the present disclosure, the terms "Angular Spectrum Propagation based image focusing algorithm" or "ASP-based image focusing algorithm" refer to a type of image focusing algorithm that implements angular spectrum propagation techniques. For example, the ASP-based image focusing algorithm may computationally model the propagations of a light wave field (for example, the electromagnetic wave from the light) from the digital holography image data. As an example, the ASP-based image focusing algorithm may computationally expand the light wave field from the digital holography image data into a summation of light wave planes (for example, based on Fourier optics), where each light wave plane corresponds to a focal depth. As such, the ASP-based image focusing algorithm may computationally focus the upper reference mark image region and generate different images based on the upper reference mark image region at different focal depths.

In some embodiments, the upper reference mark is in focus from the upper reference mark image region at the maximum focal depth. As described above, the maximum focal depth corresponds to a first focal depth between the upper surface of the flow chamber device and the imaging device. Because the upper reference mark is disposed on the upper surface of the flow chamber device, the upper reference mark is in focus when the ASP-based image focusing algorithm computationally focuses the upper reference mark image region at the maximum focal depth.

As such, the processor component may determine the maximum focal depth by providing the upper reference mark image region to the ASP-based image focusing algorithm. For example, the ASP-based image focusing algorithm may computationally focus the upper reference mark image region at different focal depths to generate a series of images, and determine in which one of the series of images is the upper reference mark optimally focused. Once the processor component determines that the upper reference mark is optimally focused in an image generated by the ASP-based image focusing algorithm, the processor component determines that the focal depth of such image corresponds to the maximum focal depth.

In some embodiments, subsequent to block A, the example method 600 proceeds to step/operation 604. At step/operation 604, a processor component (such as, but not limited to, the processor component 301 of the example remote computing server 105 described above in connection with at least FIG. 1 and FIG. 3, and/or the processor component 208 of the example mobile computing device 101A described in connection with at least FIG. 1 and FIG. 2) focuses the lower reference mark image region based at least in part on an ASP-based image focusing algorithm.

In some embodiments, the lower reference mark is in focus from the lower reference mark image region at the minimum focal depth. As described above, the minimum focal depth corresponds to a second focal depth between the lower surface of the flow chamber device and the imaging device. Because the lower reference mark is disposed on the lower surface of the flow chamber device, the lower reference mark is in focus when the ASP-based image focusing algorithm computationally focuses the lower reference mark image region at the minimum focal depth.

As such, the processor component may determine the minimum focal depth by providing the lower reference mark image region to the ASP-based image focusing algorithm. For example, the ASP-based image focusing algorithm may computationally focus the lower reference mark image region at different focal depths to generate a series of images, and determine in which one of the series of images is the lower reference mark optimally focused. Once the processor component determines that the lower reference mark is optimally focused in an image generated by the ASP-based image focusing algorithm, the processor component determines that the focal depth of such image corresponds to the minimum focal depth.

In some embodiments, subsequent to block A, the example method 600 may optionally proceed to step/operation 606. At step/operation 606, a processor component (such as, but not limited to, the processor component 301 of the example remote computing server 105 described above in connection with at least FIG. 1 and FIG. 3, and/or the processor component 208 of the example mobile computing device 101A described in connection with at least FIG. 1 and FIG. 2) extracts authentication data associated with at least one of the upper reference mark or the lower reference mark.

In some embodiments, at least one of the upper reference mark or the lower reference mark comprises an authentication indicium that provides authentication data. As described above, the upper reference mark and/or the lower reference mark may be in the form of or comprise a serial number and/or media authentication markings. For example, at least one of the upper reference mark and/or the lower reference mark may comprise an authentication indicium in the form of a serial number. In such an example, the processor component may extract the authentication data (e.g. the serial number) from the upper reference mark image region and/or the lower reference mark image region (based on whether the upper reference mark and/or the lower reference mark comprises the authentication indicium). The processor component may further determine whether the flow chamber device is an authenticated or genuine flow chamber device.

For example, the processor component may determine whether the extracted authentication data (e.g. the serial number) matches any authentication data associated with the flow chamber device that is stored in an authentication database. If the extracted authentication data matches authentication data in the authentication database, the processor component may determine that the flow chamber device is an authenticated or genuine flow chamber device, and may provide an authentication success notification to a client device (for example, the mobile computing device described above) and continue with other steps/operations described herein. If the extracted authentication data does not match authentication data in the authentication database, the processor component may determine that the flow chamber device is an unauthenticated or counterfeit flow chamber device, and may provide an authentication failure notification to a client device (for example, the mobile computing device described above) and forgo other steps/operations described herein.

In some embodiments, step/operation 602, step/operation 604, and/or step/operation 606 may be performed in any sequence. Subsequent to and/or in response to step/operation 602, step/operation 604, and step/operation 606, the example method 600 proceeds to block B. Referring back to FIG. 5, block B returns back to step/operation 507.

Figure 7:
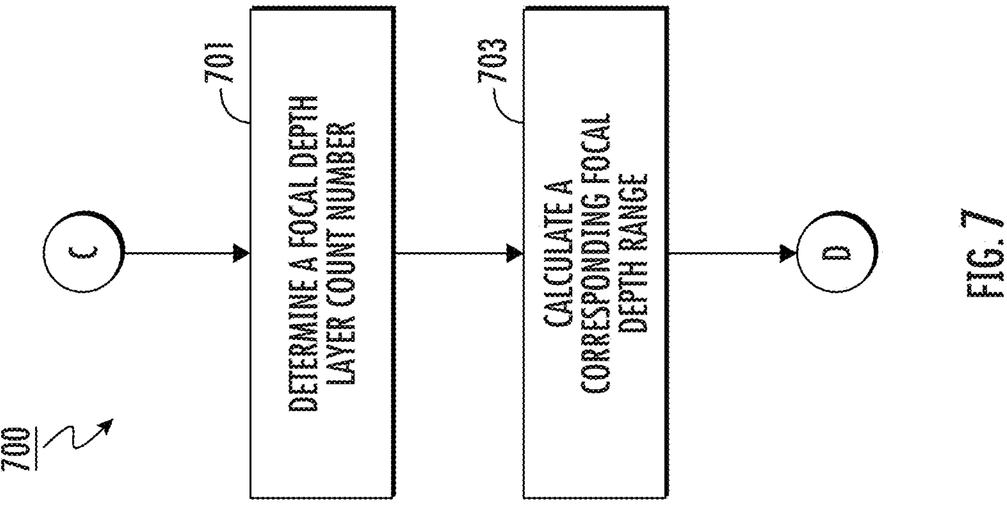
FIG. 7 is an example flow diagram illustrating example steps/operations associated with an example method for analyzing fluid samples in accordance with some example embodiments described herein.

Referring now to FIG. 7, an example method 700 of analyzing fluid samples in accordance with some example embodiments described herein is illustrated. In particular, the example method 700 illustrates some example additional and/or alternative steps/operations associated with determining the plurality of focal depth layers associated with the digital holography image data in an example method for analyzing fluid samples (for example, associated with step/operation 509 described above in connection with FIG. 5) in accordance with some embodiments of the present disclosure.

Referring now to FIG. 7, the example method 700 starts at block C. As illustrated in FIG. 5, block C is connected to step/operation 509, where the processor component focuses each of a plurality of focal depth layers associated with the digital holography image data. In some embodiments, the processor component may determine the plurality of focal depth layers prior to focusing each of the plurality of focal depth layers.

Subsequent to and/or in response to block C, the example method 700 proceeds to step/operation 701. At step/operation 701, a processor component (such as, but not limited to, the processor component 301 of the example remote computing server 105 described above in connection with at least FIG. 1 and FIG. 3, and/or the processor component 208 of the example mobile computing device 101A described in connection with at least FIG. 1 and FIG. 2) determines a focal depth layer count number.

In some embodiments, the focal depth layer count number is associated with the plurality of focal depth layers. For example, the focal depth layer count number indicates the number of focal depth layers.

In some embodiments, the focal depth layer count number may be determined based on the image focusing algorithm utilized by the processor component so as to calibrate the image focusing algorithm and optimize the accuracy of the image focusing algorithm. For example, the processor component may implement an ASP-based image focusing algorithm, and may determine that the focal depth layer count number equals four. While the description above provides an example of four focal depth layers, it is noted that the scope of the present disclosure is not limited to the description above. In some examples, an example method may determine less than four or more than four focal depth layers.

Referring back to FIG. 7, subsequent to and/or in response to step/operation 701, the example method 700 proceeds to step/operation 703. At step/operation 703, a processor component (such as, but not limited to, the processor component 301 of the example remote computing server 105 described above in connection with at least FIG. 1 and FIG. 3, and/or the processor component 208 of the example mobile computing device 101A described in connection with at least FIG. 1 and FIG. 2) calculates a corresponding focal depth range associated with each of the plurality of focal depth layers.

In some embodiments, the processor component may calculate the corresponding focal depth range associated with each of the plurality of focal depth layers based at least in part on the maximum focal depth, the minimum focal depth, and the focal depth layer count number. In some embodiments, the maximum focal depth and the minimum focal depth may be determined in accordance with various examples described herein. In some embodiments, the focal depth layer count number may be determined in connection with step/operation 701 above.

In some embodiments, the maximum focal depth and the minimum focal depth may be used to calibrate an image focusing algorithm (for example, an ASP-based image focusing algorithm). For example, the maximum focal depth indicates a maximum focal distance between the imaging device and the volume of fluid sample in the flow channel of the flow chamber device, and the minimum focal depth indicates a minimum focal distance between the imaging device and the volume of fluid sample in the flow channel of the flow chamber device. In some embodiments, the focal depth difference between the maximum focal depth and the minimum focal depth indicates a span of focal depths of the fluid sample in the flow channel of the flow chamber device. As such, various embodiments of the present disclosure may calibrate the focal depth search range of the ASP-based image focusing algorithm based on the focal depth difference.

As described above, each of the plurality of focal depth layers is associated with a range or segment of focal depths. In some embodiments, the processor component may divide the focal depth difference between the maximum focal depth and the minimum focal depth by the focal depth layer count number determined at step/operation 701 to calculate the corresponding focal depth range associated with each of the plurality of focal depth layers. In some embodiments, the processor component may separately focus each focal depth layer by implementing an ASP-based image focusing algorithm.

As an example, the processor component may determine that the maximum focal depth is 0.8 millimeters and the minimum focal depth is 0.2 millimeters. The processor component may further determine that the focal depth layer count number is 4. In this example, the processor component may determine the focal depth difference is 0.6. The processor component may determine that the first focal depth layer is associated with a focal depth range between 0.2 millimeters (inclusive) to 0.35 millimeters (exclusive), the second focal depth layer is associated with a focal depth range from 0.35 millimeters (inclusive) to 0.5 millimeters (exclusive), the third focal depth layer is associated with a focal depth range from 0.5 millimeters (inclusive) to 0.65 millimeters (exclusive), and the fourth focal depth layer is associated with a focal depth range from 0.65 millimeters (inclusive) to 0.8 millimeters (inclusive). In some embodiments, the processor component may implement an ASP-based image focusing algorithm to focus each of the first focal depth layer, the second focal depth layer, the third focal depth layer, and the fourth focal depth layer, similar to various examples described herein.

While the description above provides some example values of the maximum focal depth, the minimum focal depth, and the focal depth layer count number, it is noted that the scope of the present disclosure is not limited to the description above.

As illustrated in various examples herein, the upper reference mark and the lower reference mark provide various technical advantages and benefits. For example, the upper reference mark and the lower reference mark can indicate accurate depth Z dimensions of the volume of the fluid sample in the flow channel without being affected by factors such as mechanical variations, thereby enabling various embodiments of the present disclosure to accurately calibrate the image focusing algorithm to improve its accuracy. By enabling the image focusing algorithm to focus only on segments of focal depths associated with the volume of the fluid sample in the flow channel, various embodiments of the present disclosure further improves the speed of the image focusing algorithm in processing the digital holography image data.

Referring back to FIG. 7, subsequent to and/or in response to step/operation 703, the example method 700 proceeds block D. Referring back to FIG. 5, block D returns back to step/operation 509, where the processor component may focus each of the plurality of focal depth layers.

Figure 8:
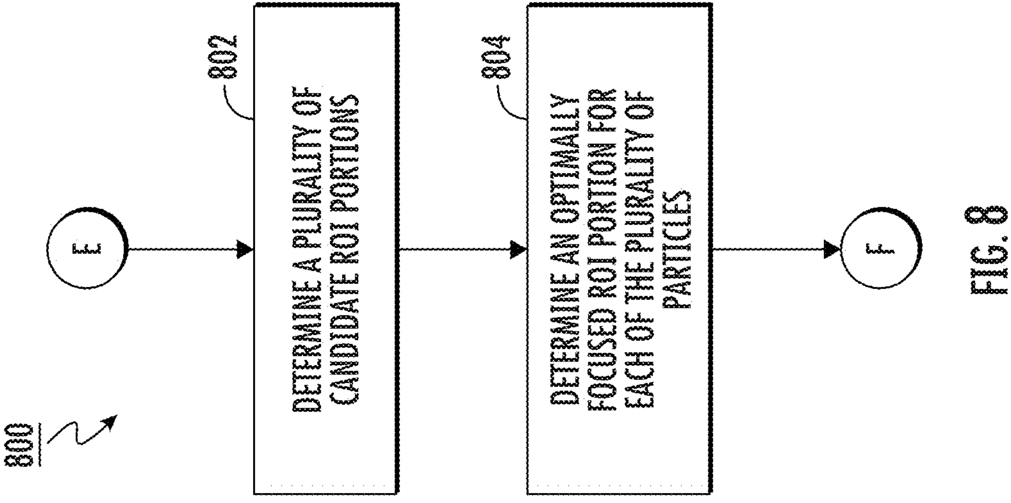
FIG. 8 is an example flow diagram illustrating example steps/operations associated with an example method for analyzing fluid samples in accordance with some example embodiments described herein.

Referring now to FIG. 8, an example method 800 of analyzing fluid samples in accordance with some example embodiments is illustrated. In particular, the example method 800 illustrates some example additional and/or alternative steps/operations associated with extracting one or more ROI portions in an example method for analyzing fluid samples (for example, associated with step/operation 509 described above in connection with FIG. 5) in accordance with some embodiments of the present disclosure.

In FIG. 8, the example method 800 starts at block E. As illustrated in FIG. 5, block E is connected to step/operation 511, where the processor component extracts one or more ROI portions.

As described above, the fluid sample may comprise one or more particles. For example, the one or more particles may comprise a plurality of particles/cells that are of interest to the subsequent analysis. As an example, the fluid sample may be in the form of PD effluent. In such an example, one or more particles that are of interest may include, but not limited to, white blood cells.

In FIG. 8, subsequent to and/or in response to block E, the example method 800 proceeds to step/operation 802. At step/operation 802, a processor component (such as, but not limited to, the processor component 301 of the example remote computing server 105 described above in connection with at least FIG. 1 and FIG. 3, and/or the processor component 208 of the example mobile computing device 101A described in connection with at least FIG. 1 and FIG. 2) determines a plurality of candidate ROI portions.

As described above, the processor component may focus each of the plurality of focal depth layers based at least in part on an ASP-based image focusing algorithm and generate an optimally focused image for each of the plurality of focal depth layers. In some embodiments, the processor component may process the optimally focused images associated with different focal depth layers to identify the one or more particles/cells of interest shown in the optimally focused images. In some embodiments, the processor component may extract a plurality of candidate ROI portions from the optimally focused images, where each of the plurality of candidate ROI portions shows one or more particles/cells of interest.

For example, particles/cells of interest may be suspended at various depths in the fluid sample as described above, and a particular particle/cell of interest may be captured in different optimally focused images associated with different focal depth layers (e.g. at different focal depth). In this example, the processor component may determine a candidate ROI portion from each of the different optimally focused images where the particular particle/cell of interest is shown in the candidate ROI portion. For example, the processor component may implement image recognition techniques to process the optimally focused images and extract/crop candidate ROI portions from the optimally focused images where the particular particle/cell of interest is shown.

As an example, the fluid sample may be a PD effluent, and the particles of interest may be white blood cells that are suspended at various depths in the PD effluent. In this example, a white blood cell may be captured in different optimally focused images at different focal depths, and the processor component may extract a candidate ROI portion from each of the optimally focused images where the white blood cell is shown.

Referring back to FIG. 8, subsequent to and/or in response to step/operation 802, the example method 800 proceeds to step/operation 804. At step/operation 804, a processor component (such as, but not limited to, the processor component 301 of the example remote computing server 105 described above in connection with at least FIG. 1 and FIG. 3, and/or the processor component 208 of the example mobile computing device 101A described in connection with at least FIG. 1 and FIG. 2) determines an optimally focused ROI portion for each of the plurality of particles.

As illustrated in the example above, a particle of interest may be visible in more than one focal depth layer. In some embodiments, the processor component selects the optimum representation of the particle of interest. For example, the processor component may compare the ROI portions where a particle of interest is shown, and determine which one of the ROI portions is the most in focus. The processor component may determine the ROI portion that is the most in focus as the optimally focused ROI portion for the particle of interest.

In some embodiments, the processor component may repeat this process for each particle of interest, and therefore determine an optimally focused ROI portion for each of the plurality of particles.

In some embodiments, subsequent to determining an optimally focused ROI portion for each of the plurality of particles, the processor component may combine different optimally focused ROI portions into a final image. In such an example, the final image comprises images of particles/cells of interest from the fluid sample that are optimally focused.

Referring back to FIG. 8, subsequent to step/operation 804, the example method 800 proceeds to block F. Referring back to FIG. 5, block F returns back to step/operation 511.

It is to be understood that the disclosure is not to be limited to the specific embodiments disclosed, and that modifications and other embodiments are intended to be included within the scope of the appended claims. Although specific terms are employed herein, they are used in a generic and descriptive sense only and not for purposes of limitation, unless described otherwise.

The invention claimed is:

1. A computer-implemented method for analyzing fluid samples comprising:
- receiving, by a processor, digital holography image data associated with a fluid sample in a flow chamber device comprising an upper reference mark on an upper surface of the flow chamber device and a lower reference mark on a lower surface of the flow chamber device, wherein the upper surface of the flow chamber device corresponds to an upper inner surface of a flow channel in the flow chamber device, and wherein the lower surface of the flow chamber device corresponds to a lower inner surface of the flow channel in the flow chamber device;
- determining, by the processor, a maximum focal depth and a minimum focal depth associated with the digital holography image data based at least in part on an upper reference mark image region and a lower reference mark image region of the digital holography image data, respectively;
- generating, by the processor, a plurality of images for each of a plurality of focal depth layers associated with the digital holography image data based at least in part on the maximum focal depth and the minimum focal depth, wherein the maximum focal depth corresponds to a first focal depth between the upper surface of the flow chamber device and an imaging device, wherein the minimum focal depth corresponds to a second focal depth between the lower surface of the flow chamber device and the imaging device, and wherein the imaging device is positioned under the flow channel of the flow chamber device;
- comparing reference mark sizes associated with the upper reference mark and the lower reference mark with image sizes of the upper reference mark and the lower reference mark of the digital holography image data;
- determining a scale factor based at least in part on the comparation;
- scaling one or more particle or cell dimensions of particles or cells of interest of the digital holography image data; and
- determining actual sizes of the particles or cells of interest associated with the fluid sample based at least in part on the scaled one or more particle or cell dimensions.

2. The computer-implemented method of claim 1 further comprising:

extracting, from the digital holography image data, the upper reference mark image region associated with the upper reference mark and the lower reference mark image region associated with the lower reference mark.

3. The computer-implemented method of claim 1 further comprising:

focusing each of the plurality of focal depth layers associated with the digital holography image data based at least in part on the maximum focal depth and the minimum focal depth; and extracting, from the plurality of focal depth layers, one or more region of interest (ROI) portions associated with the fluid sample.

4. The computer-implemented method of claim 1, wherein the upper reference mark image region is extracted from the digital holography image data based at least in part on an upper reference mark location associated with the upper reference mark, wherein the lower reference mark image region is extracted from the digital holography image data based at least in part on a lower reference mark location associated with the lower reference mark.

5. The computer-implemented method of claim 1 further comprising:

focusing the upper reference mark image region based at least in part on an Angular Spectrum Propagation (ASP) based image focusing algorithm, wherein the upper reference mark is in focus from the upper reference mark image region at the maximum focal depth.

6. The computer-implemented method of claim 1 further comprising:

focusing the lower reference mark image region based at least in part on an Angular Spectrum Propagation (ASP) based image focusing algorithm, wherein the lower reference mark is in focus from the lower reference mark image region at the minimum focal depth.

7. The computer-implemented method of claim 1, wherein at least one of the upper reference mark or the lower reference mark comprises an authentication indicium.

8. The computer-implemented method of claim 7, wherein the authentication indicium comprises at least one of a serial number or media authentication markings.

9. An apparatus for analyzing fluid samples comprising at least one processor and at least one non-transitory memory comprising program code, the at least one non-transitory memory and the program code configured to, with the at least one processor, cause the apparatus to at least:

receive, by the at least one processor, digital holography image data associated with a fluid sample in a flow chamber device comprising an upper reference mark on an upper surface of the flow chamber device and a lower reference mark on a lower surface of the flow chamber device, wherein the upper surface of the flow chamber device corresponds to an upper inner surface of a flow channel in the flow chamber device and wherein the lower surface of the flow chamber device corresponds to a lower inner surface of the flow channel in the flow chamber device;

determine, by the at least one processor, a maximum focal depth and a minimum focal depth associated with the digital holography image data based at least in part on an upper reference mark image region and a lower reference mark image region of the digital holography image data, respectively;

generate, by the at least one processor, a plurality of images for each of a plurality of focal depth layers associated with the digital holography image data based at least in part on the maximum focal depth and the minimum focal depth, wherein the maximum focal depth corresponds to a first focal depth between the upper surface of the flow chamber device and an imaging device, wherein the minimum focal depth corresponds to a second focal depth between the lower surface of the flow chamber device and the imaging device, and wherein the imaging device is positioned under the flow channel of the flow chamber device;

compare reference mark sizes associated with the upper reference mark and the lower reference mark with image sizes of the upper reference mark and the lower reference mark of the digital holography image data;

determine a scale factor based at least in part on the comparation;

scale one or more particle or cell dimensions of particles or cells of interest of the digital holography image data; and determine actual sizes of the particles or cells of interest associated with the fluid sample based at least in part on the scaled one or more particle or cell dimensions.

10. The apparatus of claim 9, wherein the at least one non-transitory memory and the program code are configured to, with the at least one processor, cause the apparatus to:

extract, from the digital holography image data, the upper reference mark image region associated with the upper reference mark and the lower reference mark image region associated with the lower reference mark.

11. The apparatus of claim 9, wherein the at least one non-transitory memory and the program code are configured to, with the at least one processor, cause the apparatus to:

focus each of the plurality of focal depth layers associated with the digital holography image data based at least in part on the maximum focal depth and the minimum focal depth; and extract, from the plurality of focal depth layers, one or more region of interest (ROI) portions associated with the fluid sample.

12. The apparatus of claim 9, wherein the flow chamber device is removable or replaceable.

13. The apparatus of claim 9, wherein the upper reference mark image region is extracted from the digital holography image data based at least in part on an upper reference mark location associated with the upper reference mark, wherein the lower reference mark image region is extracted from the digital holography image data based at least in part on a lower reference mark location associated with the lower reference mark.

14. The apparatus of claim 9, wherein the at least one non-transitory memory and the program code are configured to, with the at least one processor, cause the apparatus to:

focus the upper reference mark image region based at least in part on an Angular Spectrum Propagation (ASP) based image focusing algorithm, wherein the upper reference mark is in focus from the upper reference mark image region at the maximum focal depth.

15. The apparatus of claim 9, wherein the at least one non-transitory memory and the program code are configured to, with the at least one processor, cause the apparatus to:

focus the lower reference mark image region based at least in part on an Angular Spectrum Propagation (ASP) based image focusing algorithm, wherein the lower reference mark is in focus from the lower reference mark image region at the minimum focal depth.

16. The apparatus of claim 9, wherein at least one of the upper reference mark or the lower reference mark comprises an authentication indicium.

17. A computer program product comprising at least one non-transitory computer-readable storage medium having computer-readable program code portions stored therein, the computer-readable program code portions comprising an executable portion configured to:

receive digital holography image data associated with a fluid sample in a flow chamber device comprising an upper reference mark on an upper surface of the flow chamber device and a lower reference mark on a lower surface of the flow chamber device, wherein the upper surface of the flow chamber device corresponds to an upper inner surface of a flow channel in the flow chamber device and wherein the lower surface of the flow chamber device corresponds to a lower inner surface of the flow channel in the flow chamber device;

determine, a maximum focal depth and a minimum focal depth associated with the digital holography image data based at least in part on an upper reference mark image region and a lower reference mark image region of the digital holography image data, respectively;

generate a plurality of images for each of a plurality of focal depth layers associated with the digital holography image data based at least in part on the maximum focal depth and the minimum focal depth, wherein the maximum focal depth corresponds to a first focal depth between the upper surface of the flow chamber device and an imaging device, wherein the minimum focal depth corresponds to a second focal depth between the lower surface of the flow chamber device and the imaging device, and wherein the imaging device is positioned under the flow channel of the flow chamber device;

compare reference mark sizes associated with the upper reference mark and the lower reference mark with image sizes of the upper reference mark and the lower reference mark of the digital holography image data;

determine a scale factor based at least in part on the comparation;

scale one or more particle or cell dimensions of particles or cells of interest of the digital holography image data; and determine actual sizes of the particles or cells of interest associated with the fluid sample based at least in part on the scaled one or more particle or cell dimensions.

18. The computer program product of claim 17, wherein the upper reference mark image region is extracted from the digital holography image data based at least in part on an upper reference mark location associated with the upper reference mark, wherein the lower reference mark image region is extracted from the digital holography image data based at least in part on a lower reference mark location associated with the lower reference mark.

19. The computer program product of claim 17, wherein at least one of the upper reference mark or the lower reference mark comprises an authentication indicium.

20. The computer program product of claim 17, wherein the flow chamber device is removable or replaceable.

* * * * *